(12) United States Patent
Park et al.

(10) Patent No.: US 11,531,419 B2
(45) Date of Patent: Dec. 20, 2022

(54) ELECTRONIC DEVICE FOR IDENTIFYING COORDINATES OF EXTERNAL OBJECT TOUCHING TOUCH SENSOR

(71) Applicant: Samsung Electronics Co., Ltd., Gyeonggi-do (KR)

(72) Inventors: Jongdae Park, Gyeonggi-do (KR); Bongjun Ko, Gyeonggi-do (KR); Kyoungtaek Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/431,910

(22) PCT Filed: Feb. 19, 2020

(86) PCT No.: PCT/KR2020/002433
§ 371 (c)(1),
(2) Date: Aug. 18, 2021

(87) PCT Pub. No.: WO2020/171610
PCT Pub. Date: Aug. 27, 2020

(65) Prior Publication Data
US 2022/0147176 A1 May 12, 2022

(30) Foreign Application Priority Data

Feb. 19, 2019 (KR) .......................... 10-2019-0019537

(51) Int. Cl.
*G06F 3/041* (2006.01)
*G06F 3/044* (2006.01)
(52) U.S. Cl.
CPC ............ *G06F 3/0416* (2013.01); *G06F 3/044* (2013.01); *G06F 2203/04105* (2013.01); *G06F 2203/04108* (2013.01)

(58) Field of Classification Search
CPC .................. G06F 3/0416; G06F 3/044; G06F 2203/04105; G06F 2203/04108
See application file for complete search history.

(56) References Cited

U.S. PATENT DOCUMENTS

| | | |
|---|---|---|
| 6,781,577 B2 | 8/2004 | Shigetaka |
| 9,430,107 B2 | 8/2016 | Hanauer et al. |

(Continued)

FOREIGN PATENT DOCUMENTS

| | | |
|---|---|---|
| JP | 2000-56914 A | 2/2000 |
| JP | 2014-48997 A | 3/2014 |

(Continued)

*Primary Examiner* — Ryan A Lubit
(74) *Attorney, Agent, or Firm* — Cha & Reiter, LLC

(57) ABSTRACT

According to an embodiment, an electronic device comprises a housing, a display including at least one region corresponding to at least one surface of the housing, a touch sensor for detecting a touch input on the at least one region, a first processor operably coupled to the touch sensor, and a second processor operably coupled to the display, the touch sensor, and the first processor, wherein the first processor is configured to detect first position information of an external object touching the at least one region and first energy information related to a contact surface of the external object, based on a capacitance measured from the touch sensor at a first time point, detect second position information of the external object which touches the at least one region and second energy information related to the contact surface of the external object, based on a capacitance measured from the touch sensor at a second time point which comes after the first time point, and transmit a signal to the second processor, wherein the signal is based on at least one of the first position information, the second position information, the first energy information, and the second energy information.

10 Claims, 17 Drawing Sheets

(56) References Cited

U.S. PATENT DOCUMENTS

| | | | |
|---|---|---|---|
| 9,817,515 B2 | 11/2017 | Kang | |
| 2003/0206162 A1* | 11/2003 | Roberts | G06F 3/04142 |
| | | | 345/173 |
| 2013/0201118 A1 | 8/2013 | Liu | |
| 2014/0078115 A1* | 3/2014 | Itsuki | G06F 3/044 |
| | | | 345/178 |
| 2016/0231851 A1* | 8/2016 | Liu | G06F 3/0416 |
| 2017/0003876 A1* | 1/2017 | Marsden | G06F 3/0231 |
| 2017/0068425 A1* | 3/2017 | Everitt | G06F 3/0416 |
| 2018/0046304 A1* | 2/2018 | Kim | G06F 3/0446 |
| 2018/0074637 A1* | 3/2018 | Rosenberg | G06F 3/03545 |
| 2018/0095569 A1* | 4/2018 | Zhang | G06F 3/04166 |
| 2018/0196569 A1 | 7/2018 | Jun et al. | |
| 2018/0275796 A1* | 9/2018 | Kim | G06F 21/32 |

FOREIGN PATENT DOCUMENTS

| | | |
|---|---|---|
| KR | 10-0672539 B1 | 1/2007 |
| KR | 10-2010-0044770 A | 4/2010 |
| KR | 10-1776601 B1 | 9/2017 |
| KR | 10-2018-0017852 A | 2/2018 |
| KR | 10-1859713 B1 | 5/2018 |

\* cited by examiner

| | B7 | B6 | B5 | B4 | B3 | B2 | B1 | B0 |
|---|---|---|---|---|---|---|---|---|
| BYTE0 | Touch status | | | | | | EID | |
| BYTE1 | | | | TID [3:0] | | | | |
| BYTE2 | X [11:4] | | | | | | | |
| BYTE3 | Y [11:4] | | | | | | | |
| BYTE4 | X [3:0] | | | | Y [3:0] | | | |
| BYTE5 | Major [7:0] | | | | | | | |
| BYTE6 | Minor [7:0] | | | | | | | |
| BYTE7 | Touch Type[3:2] | | Z[5:0] | | | | | |
| BYTE8 | Touch Type[1:0] | | Left event[5:0] | | | | | |
| BYTE9 | Max energy_X [11:4] | | | | | | | |
| BYTE10 | Max energy_Y [11:4] | | | | | | | |
| BYTE11 | Max energy_X [3:0] | | | | Max energy_Y [3:0] | | | |

ELECTRONIC DEVICE FOR IDENTIFYING COORDINATES OF EXTERNAL OBJECT TOUCHING TOUCH SENSOR

CROSS REFERENCE TO RELATED APPLICATIONS

This application is a National Phase Entry of PCT International Application No. PCT/KR2020/002433/, which was filed on Feb. 19, 2020, and claims a priority to Korean Patent Application No. 10-2019-0019537, which was filed on Feb. 19, 2019, the contents of which are incorporated herein by reference.

TECHNICAL FIELD

Certain embodiments described below relate to an electronic device for identifying coordinates of an external object which touches a touch sensor.

BACKGROUND ART

Recently, with the development of digital technologies, various types of electronic devices are widely used such as a mobile communication terminal, a smart phone, a tablet Personal Computer (PC), an electronic organizer, a Personal Digital Assistant (PDA), a wearable device, or the like. The electronic device may include a display including a touch sensor, such as a touch screen.

DISCLOSURE OF INVENTION

Technical Problem

A user may control an electronic device by touching at least part of a display. The area, pressure, and/or position of a contact surface of the external surface one the display may not be the same as the external object (finger or stylus) touching the surface. There may be a need for a method in which the electronic device more accurately identifies the touch input by considering the area, pressure, and/or position of the contact surface of the external object, which change over time.

Technical problems to be achieved in the disclosure are not limited to the technical problems mentioned above, and other technical problems not mentioned herein can be clearly understood by those skilled in the art to which the disclosure pertains from the following descriptions.

Solution to Problem

According to an embodiment, an electronic device comprises a housing, a display including at least one region corresponding to at least one surface of the housing, a touch sensor for detecting a touch input on the at least one region, a first processor operably coupled to the touch sensor, and a second processor operably coupled to the display, the touch sensor, and the first processor, wherein the first processor is configured to detect first position information of an external object touching the at least one region and first energy information related to a contact surface of the external object, based on a capacitance measured from the touch sensor at a first time point, detect second position information of the external object which touches the at least one region and second energy information related to the contact surface of the external object, based on a capacitance measured from the touch sensor at a second time point which comes after the first time point, and transmit a signal to the second processor, wherein the signal is based on at least one of the first position information, the second position information, the first energy information, and the second energy information.

According to an embodiment, an electronic device comprises a display, a touch sensor disposed to the display, and a processor operably coupled to the touch sensor, wherein the processor is configured to, detect first position information of an external object touching the display corresponding to the touch sensor and first energy information related to a contact surface of the external object, based on a capacitance measured from the touch sensor at a first time point, detect second position information of the external object touching the at least one region and second energy information related to the contact surface of the external object, based on a capacitance measured from the touch sensor at a second time point which comes after the first time point, and transmit a signal to a second processor, wherein the signal is based on at least one of the first position information, the second position information, the first energy information, and the second energy information.

According to an embodiment, an electronic device comprises a housing, a display including at least one region corresponding to at least one surface of the housing, a touch sensor for detecting a touch input on the at least one region, a first processor operably coupled to the touch sensor, and a second processor operably coupled to the display, the touch sensor, and the first processor, wherein the second processor is configured to identify a signal related to an external object touching the display and based on a specified period from the first processor identify a first position of the display at a first time point when the signal was generated and a second position of the display at a second time point when at least one of an area and pressure of the external object is maximum during a specified period of time starting from the first time point, based on the identified signal, and perform at least one function of an application, based on at least one of the first position and second position identified from the signal.

Advantageous Effects of Invention

An electronic device and method thereof according to certain embodiments can more accurately identify a touch input by considering an area, pressure, and/or position of a contact surface of an external object, which change over time, thereby providing enhanced usability.

Advantages acquired in the disclosure are not limited to the aforementioned advantages. Other advantages not mentioned herein can be clearly understood by those skilled in the art to which the disclosure pertains from the following descriptions.

BRIEF DESCRIPTION OF DRAWINGS

FIG. 11 to FIG. 13 are diagrams illustrating structures of a signal generated by an electronic device according to certain embodiments;

DETAILED DESCRIPTION

Figure 1:
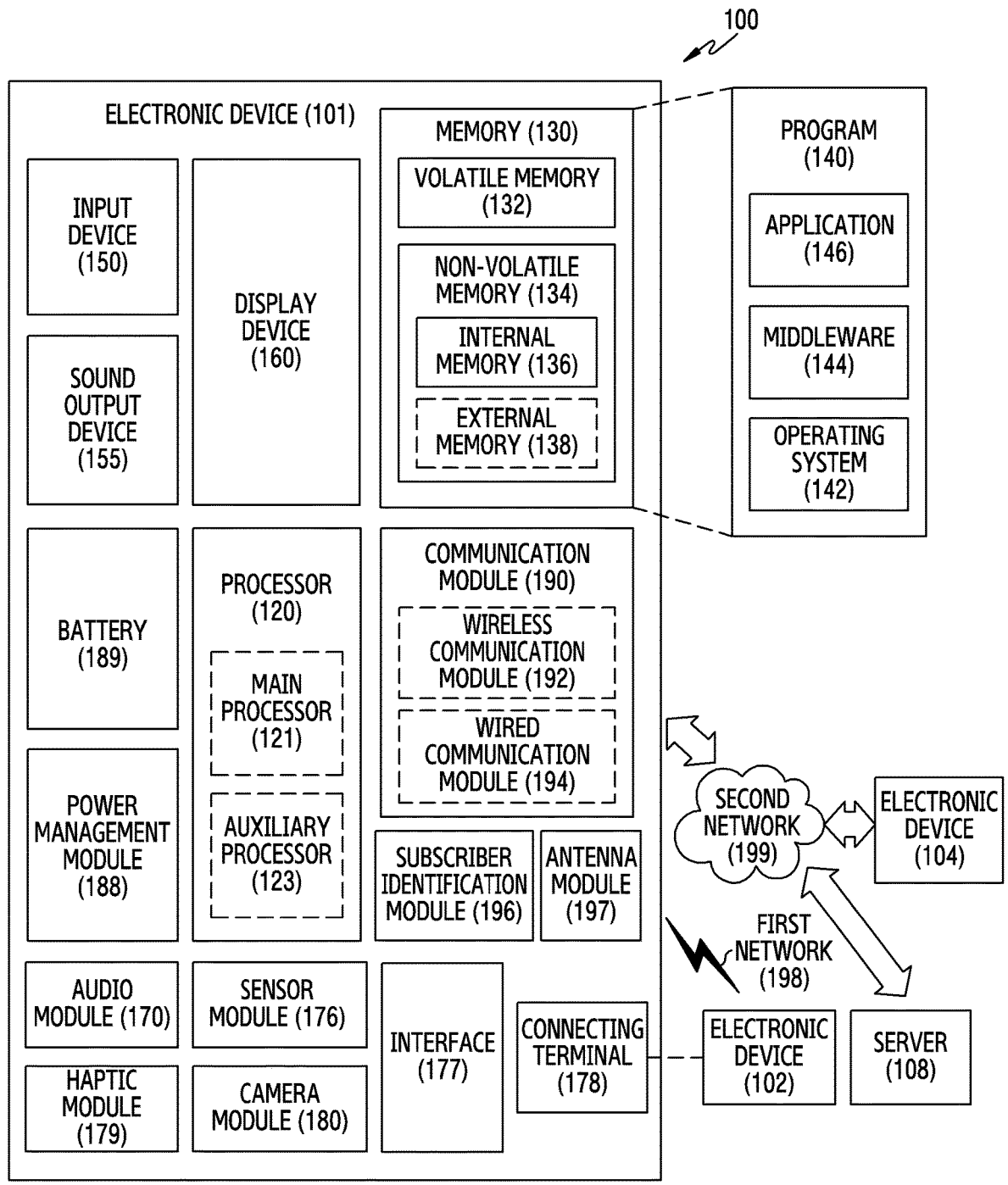
FIG. 1 is a block diagram of an electronic device in a network environment according to certain embodiments.

Hereinafter, certain embodiments of the disclosure are described with reference to the accompanying drawings. However, it should be appreciated that this is not intended to limit the technological features set forth herein to particular embodiments and include various changes, equivalents, or replacements for an embodiment of the disclosure. With regard to the description of the drawings, similar reference numerals may be used to refer to similar or related elements.

An expression "have", "may have", "include" or "may include" or the like used in the disclosure is intended to indicate a presence of a corresponding characteristic (e.g., a number, a function, an operation, or a component such as a component), and should be understood that there are additional possibilities of one or more other characteristics.

In the disclosure, an expression "A or B", "A and/or B", or "one or more of A and/or B" or the like may include all possible combinations of items enumerated together. For example, "A or B", "at least one of A and B", or "at least one of A or B" may indicate all cases where: (1) at least one A is included; (2) at least one B is included; and (3) at least one A and at least one B are both included.

Although expressions such as "$1^{st}$", "$2^{nd}$", "first", and "second" may be used in the disclosure to express various components, it is not intended to limit the corresponding components. The above expressions may be used to distinguish one component from another component. For example, a $1^{st}$ user device and a $2^{nd}$ user device are both user devices, and indicate different user devices. For example, a $1^{st}$ component may be termed a $2^{nd}$ component, and similarly, the $2^{nd}$ component may be termed the $1^{st}$ component without departing from the scope of the disclosure.

When a certain component (e.g., the $1^{st}$ component) is mentioned as being "operatively or communicatively coupled with/to" or "connected to" a different component (e.g., the $2^{nd}$ component), it is to be understood that the certain component is directly coupled with/to another component or can be coupled with/to the different component via another component (e.g., a $3^{rd}$ component). On the other hand, when the certain component (e.g., the $1^{st}$ component) is mentioned as being "directly coupled with/to" or "directly connected to" the different component (e.g., the $2^{nd}$ component), it may be understood that another component (e.g., the $3^{rd}$ component) is not present between the certain component and the different component.

An expression "configured to" used in the disclosure may be interchangeably used with, for example, "suitable for", "having the capacity to", "designed to", "adapted to", "made to", or "capable of" according to a situation. A term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an Application Processor (AP)) capable of performing corresponding operations by executing one or more software programs stored in a memory device.

Terms used in the disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

An electronic device according to certain embodiments of the disclosure may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG-1 Audio Layer 3 (MP3) player, a mobile medical device, a camera, and a wearable device. According to certain embodiments, the wearable device may include at least one of an accessory-type device (e.g., a watch, a ring, a bracelet, an anklet, a necklace, glasses, contact lenses, or a Head-Mounted Device (HMD)), a fabric- or clothes-integrated device (e.g., electronic clothes), a body attaching-type device (e.g., a skin pad or tattoo), or a body implantable device (e.g., an implantable circuit).

According to some embodiments, the electronic device may be a home appliance. The home appliance may include, for example, at least one of a TeleVision (TV), a Digital Video Disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV', or Google TV™), a game console (e.g., Xbox™, PlayStation™), an electronic dictionary, an electronic key, a camcorder, and an electronic picture frame.

According to other embodiments, the electronic device may include at least one of various medical devices (e.g., various portable medical measuring devices (e.g., a blood sugar measuring device, a heartrate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Navigation Satellite System (GNSS), an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, Point Of Sales (POS) of shops, and Internet of things (e.g., a light bulb, various sensors, an electric or gas meter, a sprinkler device, a fire alarm, a thermostat, a streetlamp, a toaster, a fitness equipment, a hot water tank, a heater, a boiler, etc.).

According to some embodiments, the electronic device may include at least one of furniture or a part of buildings/constructions, an electronic board, an electronic signature input device, a projector, and various measurement machines (e.g., water supply, electricity, gas, propagation measurement machine, etc.). In certain embodiments, the electronic device may be one or more combinations of the aforementioned various devices. According to some embodiments, the electronic device may be a flexible device. Further, the electronic device according to an embodiment of the disclosure is not limited to the aforementioned devices, and may include a new electronic device depending on technical progress.

The term 'user' used in the disclosure may refer to a person who uses the electronic device or a device (e.g., an Artificial Intelligence (AI) electronic device) which uses the electronic device.

Hereinafter, certain embodiments will be described in detail with reference to the accompanying drawings. However, for convenience of explanation, constitutional elements may be exaggerated or reduced in size in the drawings. For example, a size and thickness of each constitutional element shown in the drawings are arbitrarily shown for convenience of explanation, and thus the present disclosure is not necessarily limited thereto.

FIG. 1 describes an electronic device 100 with a display device 160 that can be used as touch input device. The user can make contact with the display device 160 using an external object, such as a finger or stylus. The location of the touch, the pressure of the touching, and transient nature of the touching can interact with a graphical user display on the display device 160, causing the input to be dependent on the foregoing.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
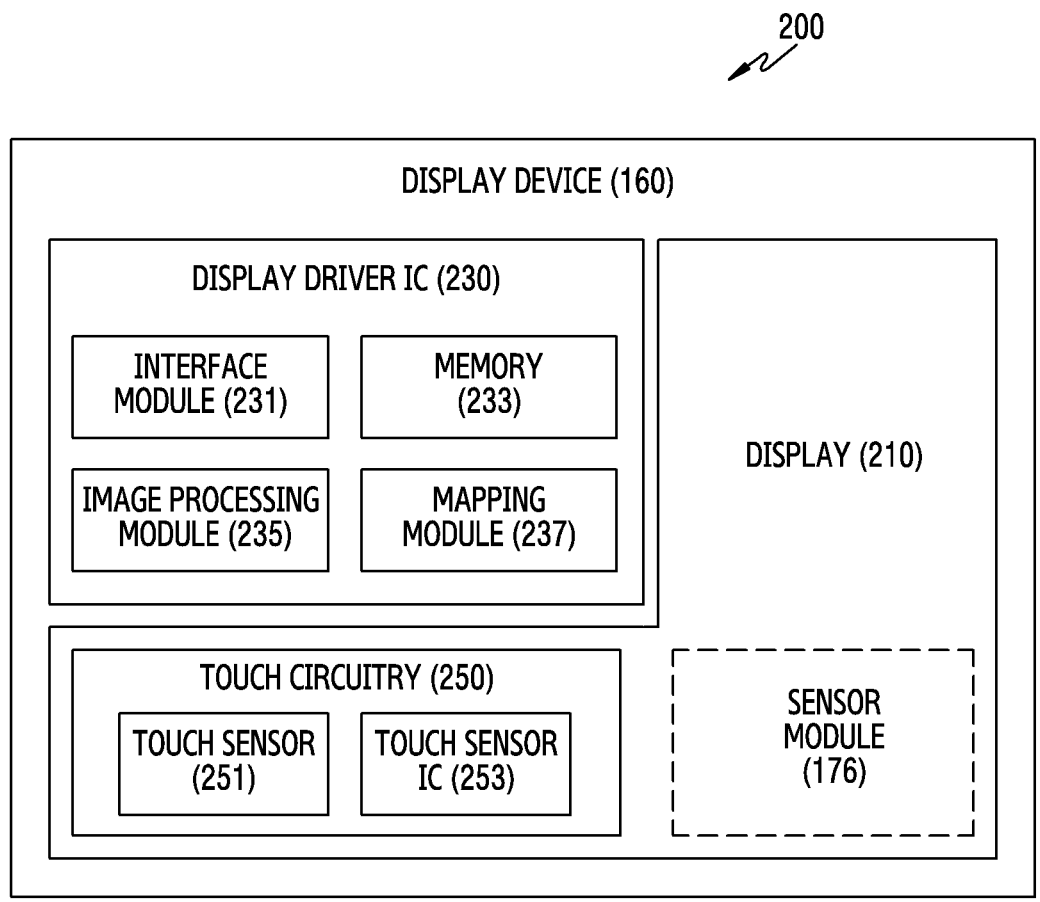
FIG. 2 is a block diagram of a display device according to certain embodiments.

FIG. 2 is a block diagram 200 illustrating the display device 160 according to certain embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3:
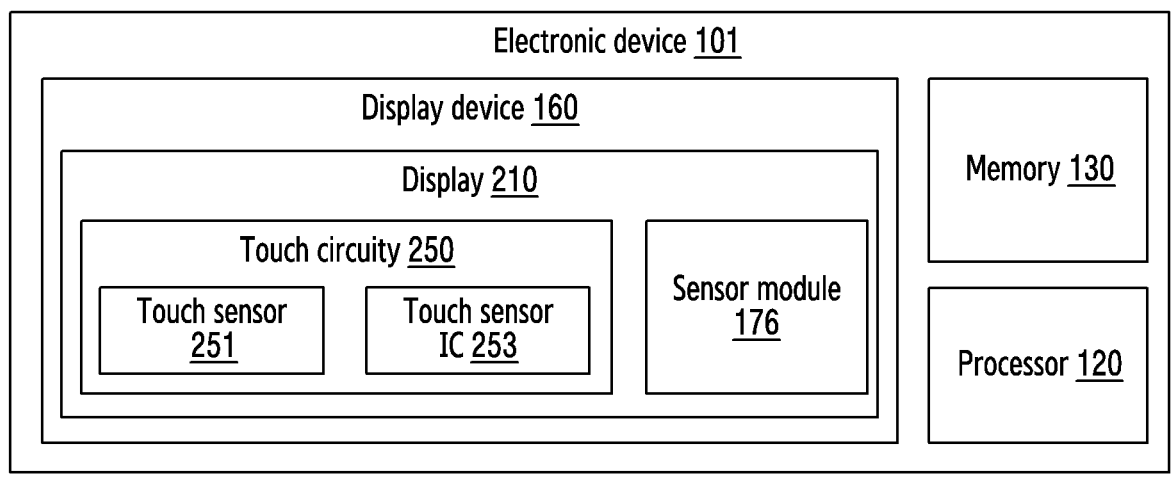
FIG. 3 is a block diagram of an electronic device including a touch circuitry according to certain embodiments.

FIG. 3 is a block diagram of an electronic device 101 including a touch circuitry 250 according to certain embodiments.

In an embodiment, the electronic device 101 may correspond to at least one of a smart phone, a smart pad, a tablet Personal Computer (PC), a Personal Digital Assistance (PDA), a laptop PC, and a desktop PC. In an embodiment, the electronic device 101 may correspond to a wearable device including at least one of an accessory-type device (e.g., a watch, a ring, a bracelet, an anklet, a necklace, glasses, contact lenses, or a Head-Mounted Device (HMD)), a fabric- or clothes-integrated device (e.g., electronic clothes), a body attaching-type device (e.g., a skin pad or tattoo), or a body implantable device (e.g., an implantable circuit). In an embodiment, the electronic device 101 may be a home appliance such as a refrigerator, a Television (TV), a cleaner, an air-conditioner, a washing machine, and an illumination device.

Referring to FIG. 3, the electronic device 101 according to certain embodiments may include a processor 120, a memory 130, and/or a display device 160. The processor 120 and the memory 130 may correspond to the processor 120 and memory 130 of FIG. 1. The display device 160 may correspond to the display device 160 of FIG. 1 and FIG. 2. The processor 120, the memory 130, and the display device 160 may be electrically and/or operably coupled, for example, by means of a communication bus (not shown).

According to certain embodiments, the display device 160 may include a display 210, and the touch circuitry 250 and/or a sensor module 176 may be disposed to the display 210. The touch circuitry 250 may include a touch sensor 251 and/or a touch sensor Integrated Circuit (IC) 253. The display 210, the touch circuitry 250, the touch sensor 251, and the touch sensor IC 253 may correspond to the display 210, touch circuitry 250, touch sensor 251, and touch sensor IC 253 of FIG. 2. The display 210, the touch circuitry 250, the touch sensor 251, and the touch sensor IC 253 may also be electrically and/or operably coupled, for example, by means of the communication bus.

The processor 120 may execute one or more instructions stored in the memory 130. The processor 120 may include a circuit for processing data, for example, at least one of an Integrated Circuit (IC), an Arithmetic Logic Unit (ALU), a Field Programmable Gate Array (FPGA), and a Large Scale Integration (LSI). The memory 130 may store data associated with the electronic device 101. The memory 130 may include a volatile memory such as a Random Access Memory (RAM) including a Static Random Access Memory (SRAM), a Dynamic RAM (DRAM), or the like, or may include a non-volatile memory such as a flash memory, an Embedded Multi-Media Card (eMMC), a Solid State Drive (SSD), or the like as well as a Read Only Memory (ROM), a Magnetoresistive RAM (MRAM), a Spin-Transfer Torque MRAM (STT-MRAM), a Phase-change RAM (PRAM), a Resistive RAM (RRAM), and a Ferroelectric RAM (FeRAM).

The memory 130 may store an instruction associated with an application and an instruction associated with an Operating System (OS). The OS is system software executed by the processor 120. The processor 120 may manage hardware components included in the electronic device 101 by executing the OS. The OS may provide an Application Programming Interface (API) as an application which is the remaining software other than the system software.

One or more applications may be installed in the memory 130 as a set of a plurality of applications. When it is said that the application is installed in the memory 130, this means that the application is stored in a format that can be executed by the processor 120 coupled to the memory 130.

The display device 160 may visually output information to a user through the display 210 including Organic Light Emitting Diodes (OLED), Liquid Crystal Display (LCD), and Light Emitting Diodes (LED). The information output within the display 210 may be determined by an operating system and/or at least one application being executed in the processor 120. In an embodiment, the touch circuitry 250 may be disposed in the display 210 to more intuitively control a User Interface (UI) which is output through the display 210. When it is said that the touch circuitry 250 is disposed in the display 210, it may mean that at least part (e.g., the touch sensor 251) of the touch circuitry 250 is disposed between a plurality of pixels included in the display 210 or above or below a layer (e.g., a pixel layer) including the plurality of pixels.

The touch circuitry 250 may include the touch sensor 251 such as a Touch Screen Panel (TSP) and the touch sensor IC 253 operably coupled with the touch sensor 251 to control the touch sensor 251. The touch sensor IC 253 may include at least one of a controller, IC, ALU, FPCA, and LSI for controlling the touch sensor 251. Hereinafter, a first processor may imply the touch sensor IC 253, and a second processor may imply the processor 120. The touch sensor panels may use at least one of a resistive film, capacitive components, a surface acoustic wave, and an infrared ray to detect a position of an external object (e.g., a user's finger, a stylus) which touches the TSP or hovers over the TSP.

While the external object and the touch sensor 251 are in contact with each other, an area, size, and/or shape of a contact surface between the touch sensor 251 and the external object such as a finger may not be constant. For example, the area, size, and/or shape of the contact surface may be non-uniform or variable in a time domain. The electronic device 101 according to certain embodiments may process a position of the external object detected by the touch sensor 251 (e.g., a coordinate of the external object in the TSP), based on a change in a state of the external object (e.g., the area, size, and/or shape of the contact surface of the external object) which touches the touch sensor 251 in the time domain.

In an embodiment, the electronic device 101 may identify a time point at which the area of the contact surface between the touch sensor 251 and the external object is maximum in the time domain. In an embodiment, the electronic device 101 may identify a time point at which the pressure of the external object which presses the touch sensor 251 is maximum in the time domain. The electronic device 101 may perform a function of at least one application and/or operating system being executed in the electronic device 101, based on a position of the external object which touches the touch sensor 251 at the time point at which the area and/or the pressure are maximum.

As described above, the touch circuitry 250 may be disposed in the display 210 to more intuitively control a User Interface (UI) which is output through the display 210. The electronic device 101 according to certain embodiments may identify a change in a state of the external object which touches the display 210 and/or the touch sensor 251 in the time domain, in order to more accurately identify a user's intention of touching the display 210 and/or the touch sensor 251 by using the external object such as a finger. Hereinafter, certain embodiments of the electronic device 101 in which the touch circuitry 250 is disposed in the display 210 will be described in greater detail with reference to FIG. 4A to FIG. 4C.

Figure 4A:
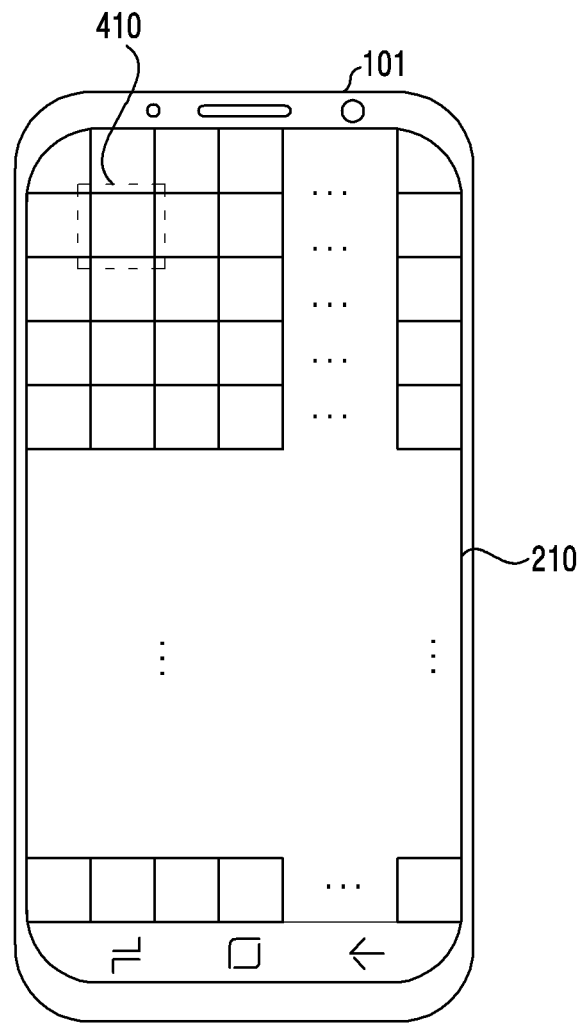
FIG. 4A to FIG. 4C are diagrams illustrating a touch sensor disposed to a display of an electronic device according to certain embodiments.
Figure 4B:
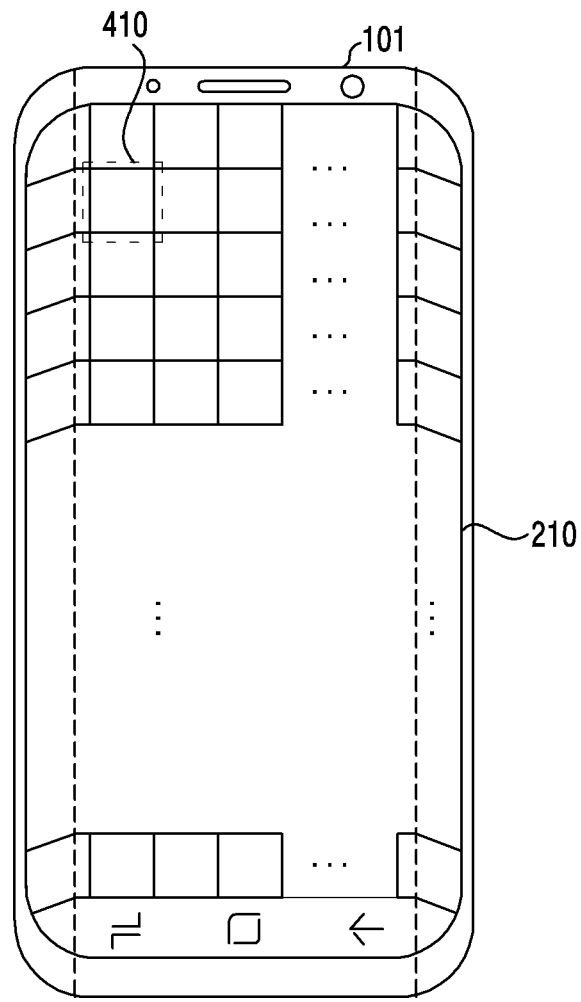
Figure 4C:
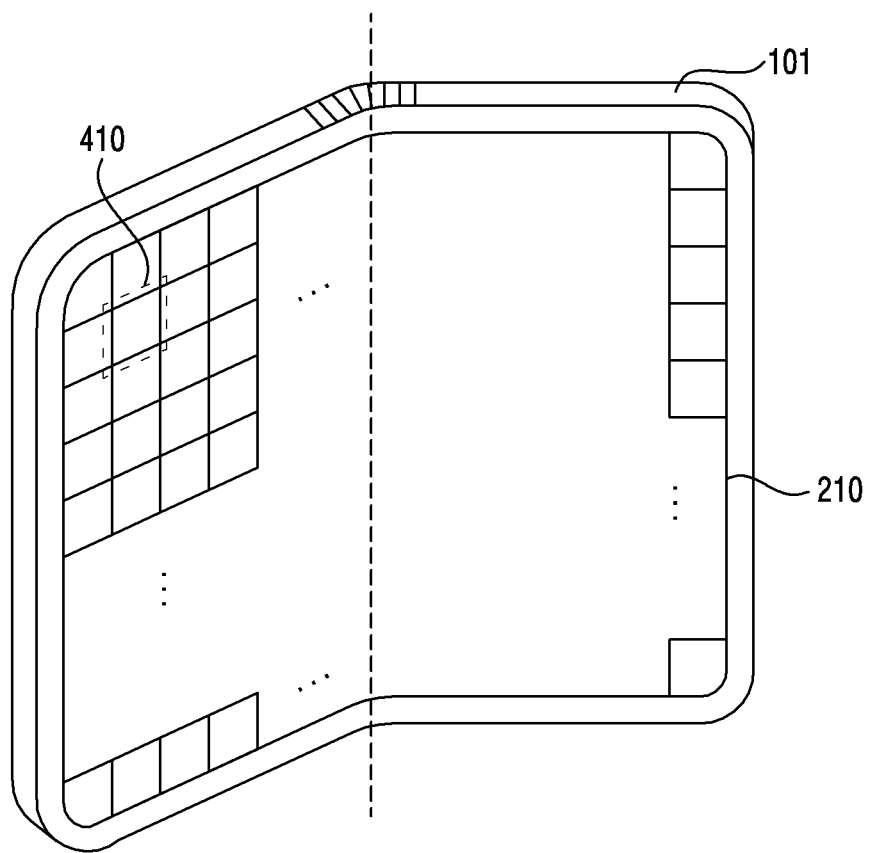

FIG. 4A to FIG. 4C are diagrams illustrating a touch sensor disposed to a display 210 of an electronic device 101 according to certain embodiments. The electronic device 101 of FIG. 4A to FIG. 4C may correspond to the electronic device 101 of FIG. 1 to FIG. 3. The display 210 and touch sensor of FIG. 4A to FIG. 4C may correspond to the display 210 and touch sensor 251 of FIG. 2 and FIG. 3.

The electronic device 101 according to certain embodiments may include a housing. The housing may constitute an appearance of the electronic device 101. The display 210 of the electronic device 101 may include at least one region corresponding to at least one surface of the housing. In an embodiment, the touch sensor disposed in the display 210 may detect a touch input on the at least one region.

Referring to FIG. 4A, a display region of the display 210 of the electronic device 101 according to an embodiment may be included in any one surface (e.g., a front face) of the housing. Referring to FIG. 4B, the display region of the display 210 of the electronic device 101 according to an embodiment may be included in two or more surfaces of in the housing. For example, the display region of the display 210 may be included in the front face, left side surface, right side surface, upper side surface, and/or lower side surface of the housing. At least part of the left side surface, front face, and right side surface may be bent depending on a specific angle and/or curvature, and a boundary of each of the left side surface, front face, and right side surface may be included in the bent part. Similarly, at least part of the upper side surface, front face, and lower side surface may also be bent depending on a specific angle and/or curvature, and a boundary of each of the upper side surface, front face, and lower side surface may be included in the bent part.

Referring to FIG. 4C, the display region of the display 210 of the electronic device 101 according to an embodiment may be included in at least one surface of each of at least two housings pivotably or rotatably coupled. In FIG. 4C, the display 210 may be a flexible display which is bendable by an external force. The at least two housings may be rotatably coupled by at least one folding portion and/or at least one hinge. The display 210 may be disposed to the at least two housings by traversing the folding portion and/or the hinge. The display 210 may be disposed to be supported by the at least two housings.

In FIG. 4A to FIG. 4C, the touch sensor may be disposed in the display 210. The touch sensor may detect an external object which touches the display 210, based on a plurality of cells including a cell 410. The cell 410 may be part of the touch sensor having a specified width and breadth (e.g., a width and breath of 4 mm). For example, at least one display region of the display 210 may be identified by a plurality of cells. Each of the plurality of cells such as the cell 410 may correspond to a minimum unit of sensor data for identifying an external object. In an embodiment, the touch sensor may obtain a single numeric value in each of the plurality of cells. For example, the touch sensor may identify or output a numeric value such as a capacitance in the cell 410 and/or a sensitivity indicating a pressure of an external object which presses the cell 410.

In an embodiment, when the touch sensor detects the external object on the basis of a capacitive element, the touch sensor may output a capacitance measured in each of the plurality of cells included in at least one region of the display 210 and/or a plurality of parameters related to the capacitance. The plurality of parameters may respectively correspond to the plurality of cells, and may indicate a capacitance measured in the corresponding cell and/or a change in the capacitance. A first processor (e.g., the touch sensor IC 253 of FIG. 3) operably coupled with the touch sensor may obtain a coordinate related to the external object, based on the capacitance measured in each of the plurality of cells. An operation performed by the electronic device 101 according to an embodiment on the basis of the capacitance will be described in detail with reference to FIG. 5.

In an embodiment, when the touch sensor includes a piezoelectric element, the touch sensor may output a pressure measured in each of the plurality of cells included in at least one region of the display 210 and/or a plurality of parameters related to the pressure. The plurality of parameters may respectively correspond to the plurality of cells, and may indicate a pressure measured in the corresponding cell and/or a change in the pressure. The first processor operably coupled with the touch sensor may obtain a coordinate related to the external object, based on the pressure measured in each of the plurality of cells.

Although certain embodiments described below will be described based on the electronic device 101 having the appearance of FIG. 4A, the certain embodiments described below may also be applied to the electronic device 101 having the appearance of FIG. 4B and FIG. 4C.

Figure 5:
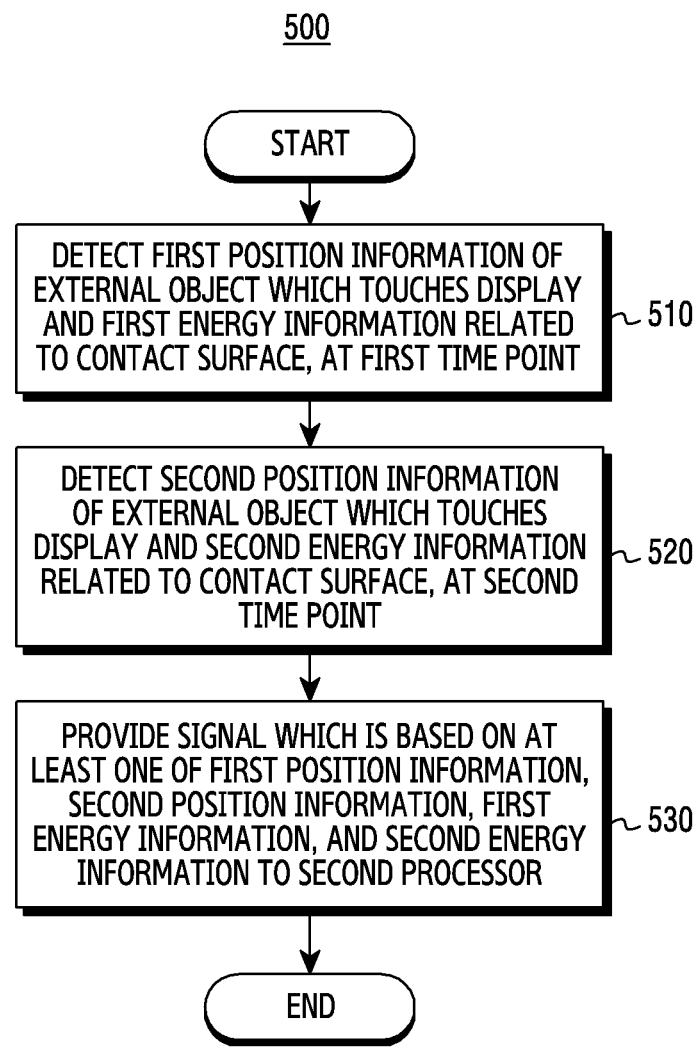
FIG. 5 is a flowchart illustrating an operation of a touch circuitry of an electronic device according to certain embodiments.

FIG. 5 is a flowchart 500 illustrating an operation of a touch circuitry of an electronic device according to certain embodiments. The electronic device may correspond to the electronic device 101 of FIG. 1 to FIG. 3 and FIG. 4A to FIG. 4C. The touch circuitry may correspond to the touch circuitry 250 of FIG. 2 and FIG. 3. The operation of FIG. 5 may be performed by the touch circuitry 250 and/or touch sensor IC 253 (or the first processor) of FIG. 2 and FIG. 3. The touch sensor IC 253 may perform, for example, at least one of operations of FIG. 5, based on firmware.

Referring to FIG. 5, in operation 510, the electronic device may detect first position information of an external object which touches a display and first energy information related to a contact surface. The position information of the external object and the first energy information are detected based on first touch information related to a capacitance measured from the touch sensor.

In an embodiment, the touch sensor may detect a touch input. A touch input occurs when an external object (such as a finger or stylus) makes contact with the display. The contact with the display causes a change in capacitance at the position of contact. The change in the capacitance may be measured by the touch sensor. The touch sensor detects the change in capacitance and the location that the capacitance changed, thereby resulting in position information. The touch sensor may also detect energy information related to a contact surface of the external object.

Thus, the electronic device may detect, at a first time point, first position information of an external object that touches a display and energy information related to a contact surface of the external object.

In an embodiment, based on information related to a capacitance and/or pressure measured from the touch sensor, the electronic device may detect the external object which touches at least one display region of the display. An operation in which the electronic device determines whether the external object touches the display will be described in detail with reference to FIG. 6 and FIG. 7. The first energy information to be detected by the electronic device may indicate an area of a contact surface between the display and the external object and/or the pressure of the external object at the first time point. The first energy information may include a sum of numeric values and/or sensitivities obtained respectively from a plurality of cells of the touch sensor at the first time point. The first energy information may include the number of cells satisfying a specified condition (e.g., a condition in which a numeric value and/or sensitivity output from a cell exceeds a specified threshold) among the plurality of cells at the first time point.

Referring to FIG. 5, in operation 520, at a second time point, the electronic device may detect second position information of the external object which touches the at least one region and second energy information related to a contact surface of the external object. The position information of the external object and the second energy information are detected based on second touch information related to a capacitance measured from the touch sensor. The second time point is a time point which comes after the first time point, and may be a time point which comes after a specified period. The second position information may indicate a position of the external object which touches the display and/or a position of a touch input at the second time point. The second energy information may indicate an area of a contact surface between the display and the external object and/or a pressure of the external object at the second time point. The second energy information may include a sum of numeric values and/or sensitivities obtained respectively from the plurality of cells of the touch sensor at the second time point. The second energy information may include the number of cells satisfying a specified condition among the plurality of cells at the second time point.

Referring to FIG. 5, in operation 530, the electronic device according to certain embodiments may provide a signal which is based on at least one of the first position information, the second position information, the first energy information, and the second energy information to a hardware component in the electronic device, such as a second processor. The signal may be transmitted from the first processor to the second processor every specified period. The signal may be transmitted from a hardware component (e.g., the first processor such as the touch sensor IC 253 of FIG. 3) which generates a signal via a communication bus to another hardware component (e.g., the second processor such as the processor 120 of FIG. 3 and/or the memory 130 of FIG. 3).

In an embodiment, the signal may include a position and energy information of the touch input and/or external object within the display identified every specified period (e.g., 120 Hz). For example, in response to detecting the first position information and the first energy information on the basis of the first time point, the electronic device may transmit a first signal including the first position information and the first energy information. In response to detecting the second position information and the second energy information on the basis of the second time point which comes after the first time point, the electronic device may transmit a second signal which is based on at least one of the second position information and the second energy information.

In an embodiment, the signal may include a position of the external object (e.g., a position of the touch input) within the display identified every specified period, and may include a specified value indicating whether energy information related to the contact surface of the external object identified every specified period is maximum. In an embodiment, the signal may include a position of the external object within the display identified every specified period, and may include information related to a time point at which the contact surface of the external object is maximum after a contact between the display and the external object is initiated (e.g., the touch input is initiated) and until a time point at which the signal is generated.

For example, the electronic device may generate a signal including a position of an external object detected at a current time point and information measured from the touch sensor at a time point at which a contact surface of the external object is maximum. In an embodiment, the electronic device may insert information which is based on sensor data measured from the touch sensor at a time point at which the contact surface is maximum into the signal including the position of the external object detected at the current time point. In an embodiment, the electronic device may identify a time point at which a change in a capacitance of the touch sensor, caused by the external object, is maximum. In an embodiment, in response to the detecting of the external object and/or the initiating of the touch input, the electronic device may identify the time point at which the change in the information, caused by the external object, is maximum, within a time interval in which the external objects touches the display. In an embodiment, in response to the detecting of the external object which touches the display, the electronic device may identify the time point at which the change in the capacitance, caused by the external object, is maximum, in the time interval in which the external object touches at least one display region of the display.

In an embodiment, the time point at which the change in the capacitance is maximum may correspond to a time point at which an area of the contact surface between the touch sensor and the external object and/or a pressure of the external object which presses the touch sensor are maximum. In an embodiment, the time point at which the change in capacitance is maximum may correspond to a time point at which the number of cells which output a numeric value greater than or equal to a specified threshold is maximum among the plurality of cells included in the touch sensor. In an embodiment, the time point at which the change in the capacitance is maximum may correspond to a time point at which a sum of numeric values respectively output from the plurality of cells included in the touch sensor is maximum. The operation in which the electronic device identifies the time point at which the change in the capacitance is maximum will be described in detail with reference to FIG. 6.

The first processor (e.g., the touch sensor IC 253 of FIG. 3) of the electronic device according to an embodiment may transmit to the second processor (e.g., the processor 120 of FIG. 3) distinct from the first processor a signal generated based on the operation 530. When a length of the time interval in which the external object touches the display is longer than the specified period, the number of signals transmitted from the first processor to the second processor may be greater than or equal to 2 (e.g., a value obtained by dividing the length of the time interval by the specified period). Within the time interval, when a plurality of signals are transmitted from the first processor to the second processor, each of the plurality of signals may include a position of the external object within the display at the first time point at which the signal is output or generated and information related to the second time point at which the change in the capacitance is maximum. The first time point and the second time point may be identical to each other or may be different from each other. In an embodiment, a difference between the first time point and the second time point may be a multiple of a specified period (e.g., a period corresponding to a frequency of 120 Hz). A structure of the plurality of signals transmitted from the first processor to the second processor will be described in detail with reference to FIG. 11 to FIG. 13.

Figure 6:
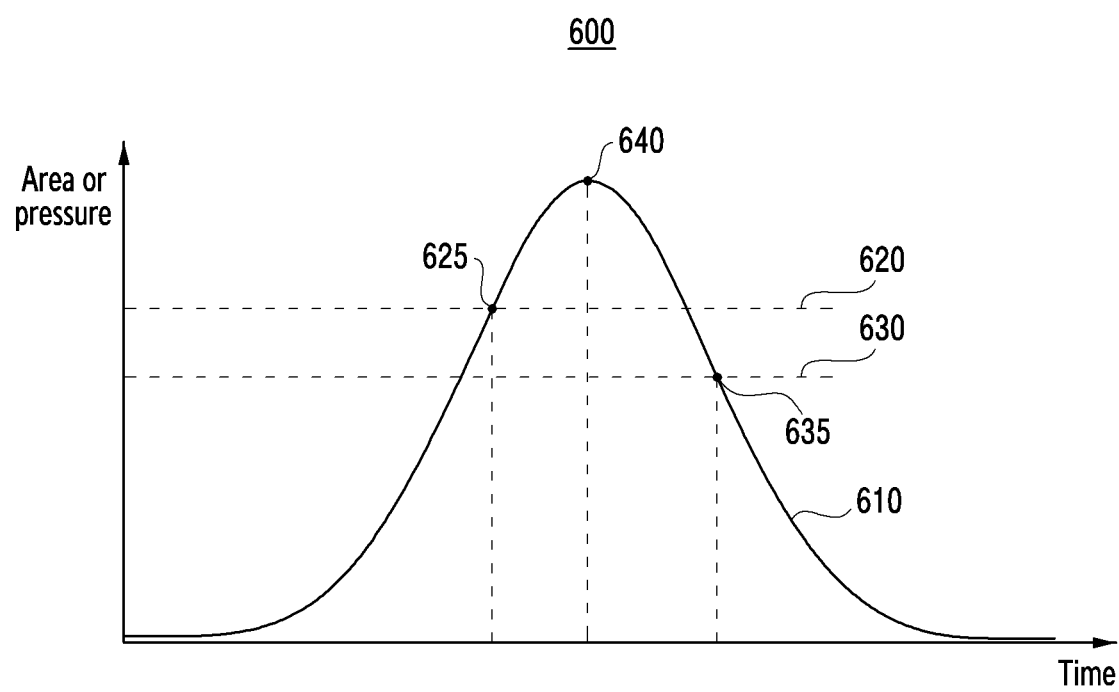
FIG. 6 is a graph illustrating an area of a contact surface between a touch sensor and an external object identified by an electronic device according to certain embodiments and/or a pressure of the external object which presses the touch sensor, in a state where the external object touches the touch sensor.

FIG. 6 is a graph 600 of a total area of a contact surface between a touch sensor and an external object certain embodiments and/or a pressure of the external object pressing the touch sensor as a function of time. The electronic device may correspond to the electronic device 101 of FIG. 1 to FIG. 3 and FIG. 4A to FIG. 4C. The touch sensor may correspond to the touch sensor 251 of FIG. FIG. 2 and FIG. 3. The external object may correspond to at least one of a user's finger and/or a stylus.

Referring to FIG. 6, a curve 610 indicating a total area of contact surface between the external object and the touch sensor or a pressure of the external object which presses the touch sensor is illustrated in a state where the external object touches at least part (e.g., at least one of a plurality of cells such as the cell 410 of FIG. 4) of the touch sensor. In an embodiment, a touch sensor including a capacitive element may identify the area of the contact surface between the touch sensor and the external object, which changes with time according to the curve 610, based on a capacitance measured from the capacitive element. In an embodiment, a touch sensor including a piezoelectric element may identify the pressure of the external object, which changes along the curve 610, based on a pressure measured from the piezoelectric element.

Sensor data output from the touch sensor may include a numeric value (e.g., sensitivity) which changes with respect to time, according to curve 610. Referring to the curve 610, the total area of the contact surface and/or the pressure may not be uniform while the external object touches the touch sensor. For example, the total area of the contact surface and/or the pressure may be gradually increased and then gradually decreased after a specific time point. Specifically, as the external object touches the touch sensor, the external object deforms, thereby increasing the total area of the contact surface, and then reforms, decreasing the total area of the contact surface. The sensor data output from the touch sensor may also indicate a change in the total area of the contact surface and/or the pressure, which change before and after the specific time point. Hereinafter, an embodiment based on the total area of the contact surface will be described. For example, another embodiment based on the pressure may also be similar to those described below.

The electronic device according to an embodiment may identify whether the total area of the contact surface between the external object and the touch sensor exceeds a specified first threshold 620 (e.g., a touch threshold), based on the sensor data. For example, the sensor data may indicate a capacitance of the touch sensor and/or a change in the capacitance.

From a time point 625 at which the area exceeds the first threshold 620, the electronic device may determine that there is contact between an external object and the touch sensor. In an embodiment, the first processor (e.g., the touch sensor IC 253 of FIG. 3) may notify the second processor (e.g., the processor 120 of FIG. 3) there is contact between the external object and the touch sensor as well as the value for time point 625.

From the time point 625, the electronic device may detect when the total area becomes less than a second threshold 630 (e.g., a release threshold). The first threshold 620 and the second threshold 630 may be different from each other. For example, the second threshold 630 may be less than the first threshold 620. At the time point 635, the electronic device may determine that the contact between the external object and the touch sensor is terminated. In an embodiment, the first processor may notify the second processor that the contact between the external object and the touch sensor is terminated at the time point 635.

Referring to FIG. 6, in a time interval between the time points 625 and 635, sensor data and/or raw data output from the touch sensor may be related to the external object which touches the touch sensor. For example, the raw data may include a capacitance measured in each of a plurality of cells (e.g., a plurality of cells including the cell 410 of FIG. 4) included in the touch sensor and/or a plurality of parameters indicating a change in the capacitance. The first processor which has received the raw data may calculate a coordinate corresponding to the external object, based on the raw data. The coordinate may correspond to, for example, a center point and/or center of mass of the contact surface between the external object and the touch sensor. In an embodiment, after the time point 625 and before the time point 635, the first processor may transmit the type of external object making contact and the calculated coordinate to the second processor.

Since the total area of the contact surface changes in the time interval between the time points 625 and 635, the coordinate may also change without being maintained within the time interval. For example, a deviation may occur between the coordinate and a user's intended coordinate. For example, with a virtual keyboard (an on-screen keyboard or a soft-keyboard), the deviation may cause a typographic error. With a control pad displayed within the display by a game application, the deviation may cause an incorrect operation.

To avoid or reduce the deviation, the electronic device according to certain embodiments may identify a time point 640 at which the total area of the contact surface is maximum and determine the coordinate at time point 640. That is, the first processor can determine that the user has made contact with the coordinate corresponding to time point 640 for the time interval of time points 625 to 630. The electronic device may identify or process a touch gesture related to the contact surface, based on a coordinate corresponding to the external object, for example, a coordinate of a center point of the contact surface and/or a coordinate of the center of mass at time point 640. Information related to the time point 640 at which the area of the contact area is maximum may be included in a signal transmitted from the first processor to the second processor every specified period, or may be transmitted independently of the signal. The touch gesture may correspond to, for example, at least one of a tap, a double-tap, a drag, a slide, a long-touch, a swipe, and/or a pinch-to-zoom. The identifying and/or processing of the touch gesture may be performed by an operating system and/or at least one application being executed in the electronic device. The operation in which the electronic device identifies or outputs the touch gesture will be described in detail with reference to FIG. 14.

Figure 7:
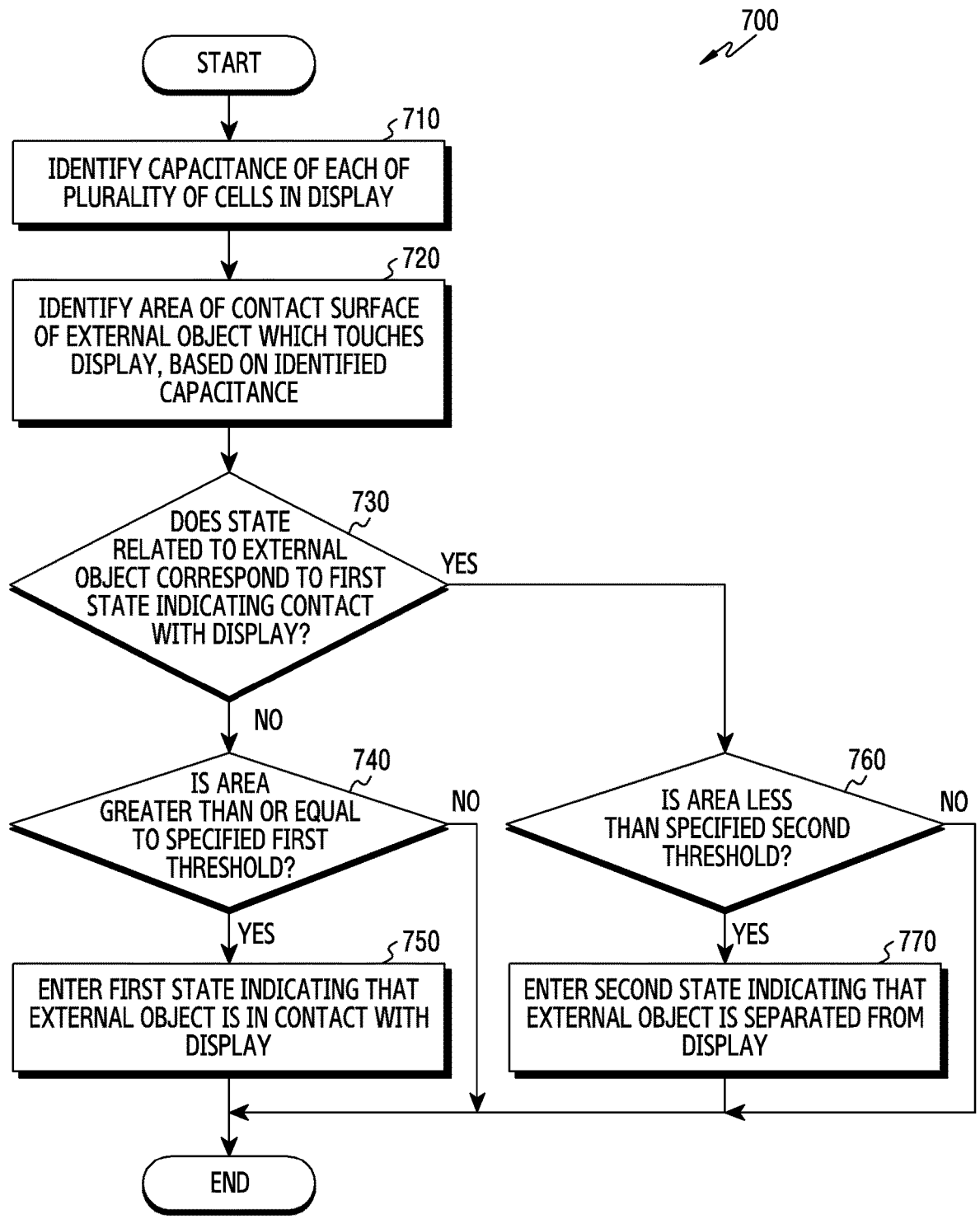
FIG. 7 is a flowchart illustrating an operation in which an electronic device identifies an external object which touches a display according to certain embodiments.

FIG. 7 is a flowchart 700 illustrating an operation in which an electronic device identifies an external object which touches a display according to certain embodiments. The electronic device may correspond to the electronic device 101 of FIG. 1 to FIG. 3 and FIG. 4A to FIG. 4C. The display may correspond to the display 210 of FIG. 2 and FIG. 3. Operations of FIG. 7 may be performed, for example, by the touch circuitry 250 and/or touch sensor IC 253 (or the first processor) disposed in the display 210 of FIG. 2 and FIG. 3.

The operations of FIG. 7 may be related to at least one of the operations of FIG. 5. In an embodiment, the electronic device and/or the first processor may perform at least one of the operations of FIG. 7 every specified period (e.g., 120 Hz). In an embodiment, the electronic device may determine a state related to the external object, based on at least one of the operations of FIG. 7. For example, the electronic device may perform at least one of the operations of FIG. 7 to enter any one of a specified first state indicating that the external object is in contact with the display and a specified second state indicating that the external object is separated from the display. The second state may indicate that the external object is not in contact with the display.

Referring to FIG. 7, in operation 710, the electronic device according to certain embodiments may identify a capacitance of each of the plurality of cells in the display. In an embodiment, a display region of the display may be divided into the plurality of cells, based on a unit region by which the touch sensor disposed in the display measures the capacitance. In an embodiment, a first processor disposed in the display of the electronic device may identify the capacitance of each of the plurality of cells and/or a plurality of parameters related to the capacitance. The capacitance may change depending on an electromagnetic field formed in a space above the display adjacent to a corresponding cell.

Referring to FIG. 7, in operation 720, the electronic device according to certain embodiments may identify a total area of a contact surface between the display and the external object, based on the identified capacitance. In an embodiment, the first processor of the electronic device may identify at least one of the total area of the contact surface, the electromagnetic field, and the capacitance, based on the plurality of parameters respectively corresponding to the plurality of cells. For example, it can be assumed that the external object is not in contact with the display at a time point at which the first processor identifies the capacitance of each of the plurality of cells on the basis of the operation 710. In this case, the total area identified by the first processor on the basis of the operation 720 may be zero (0) within an error range. For example, when the external object is in contact with the display, the area identified by the first processor on the basis of the operation 720 may change over time.

Referring to FIG. 7, in operation 730, the electronic device according to certain embodiments may determine whether a state related to the external object is the first state indicating the contact with the display. In an embodiment in which the first processor performs the operations of FIG. 7 every specified period, before identifying the capacitance on the basis of the operation 710, the first processor may enter any one of the first state or the second state and indicating that the external object is separated from the display. In this case, the first processor may determine whether the first processor enters the first state, based on the operation 730. In an embodiment, the first processor may select a threshold to be compared with the area identified in the operation 720, based on whether the electronic device and/or the first processor enters any one of the first state and the second state.

If the electronic device and/or the first processor do not enter the first state (No in the operation 730), in operation 740, the electronic device according to certain embodiments may determine whether the area identified based on the operation 720 is greater than or equal to a specified first threshold. In an embodiment, in the second state where the external object is not in contact with the display, the first processor may compare the area and the first threshold, based on the operation 720. The first threshold may correspond to, for example, the first threshold 620 of FIG. 6.

If the area identified based on the operation 720 is greater than or equal to the first threshold (Yes in the operation 740), in operation 750, the electronic device according to certain embodiments may enter the first state indicating that the external object is in contact with the display. If the area identified based on the operation 720 is less than the first threshold (No in the operation 740), the electronic device according to certain embodiments may not perform an additional operation (e.g., the operation 750) related to the area. In this case, the electronic device and/or the first processor may remain in another state (e.g., the second state) distinct from the first state.

If the electronic device and/or the first processor enter the first state (Yes in the operation 730), in operation 760, the electronic device according to certain embodiments may determine whether the area identified based on the operation 720 is greater than or equal to a specified second threshold. In an embodiment, in the first state where the external object and the display are in contact with each other, the first processor may compare the area and the second threshold, based on the operation 720. The second threshold may be identical to or different from the first threshold. For example, the second threshold may correspond to the second threshold 630 of FIG. 6.

If the area identified based on the operation 720 is less than the second threshold (Yes in the operation 760), in operation 770, the electronic device according to certain embodiments may enter the second state indicating that the external object is separated from the display. If the area identified based on the operation 720 is greater than or equal to the second threshold (No in the operation 760), the electronic device according to certain embodiments may not perform an additional operation (e.g., the operation 770) related to the area. In this case, the electronic device and/or the first processor may remain in another state (e.g., the first state) distinct from the second state.

As described above, the electronic device and/or the first processor may perform at least one of the operations of FIG. 7 every specified period. For example, the area of the contact surface between the external object and the display may change similarly to the curve 610 of FIG. 6, and a length of a time interval in which the external object and the display are in contact with each other may exceed the specified period. In this case, before the area of the contact surface increases to the first threshold of the operation 740, the first processor may not enter the first state indicating that the external object and the display are in contact, based on the operation (No in the operation 740). Referring to FIG. 6, before the time point 625 at which the area exceeds the first threshold 620, the first processor may remain in the second state indicating that the external object and the display are not in contact. After the area of the contact area exceeds the first threshold of the operation 740, the first processor may enter the first state, based on the operation 750. Referring to FIG. 6, the first processor may enter the first state at the time point 625 or another time point adjacent to the time point 625 and corresponding to the specified period. After entering the first state, the first processor may determine whether to remain in the first state or enter the second state, based on the second threshold. Referring to FIG. 6, the first processor may remain in the first state, after the time point 625 and until the time point 635 at which the area is less than or equal to the second threshold. The first processor may enter the second state at the time point 635 at which the area is less than or equal to the second threshold or another time point adjacent to the time point 635 and corresponding to the specified period.

In an embodiment, a signal generated by the first processor may include information related to entering the first state based on the operation 750, entering the second state based on the operation 770, and/or remaining in the first state. For example, the information may indicate a state related to the contact between the display and the external object. Hereinafter, the signal generated by the first processor and the information included in the signal will be described for example with reference to FIG. 8.

Figure 8:
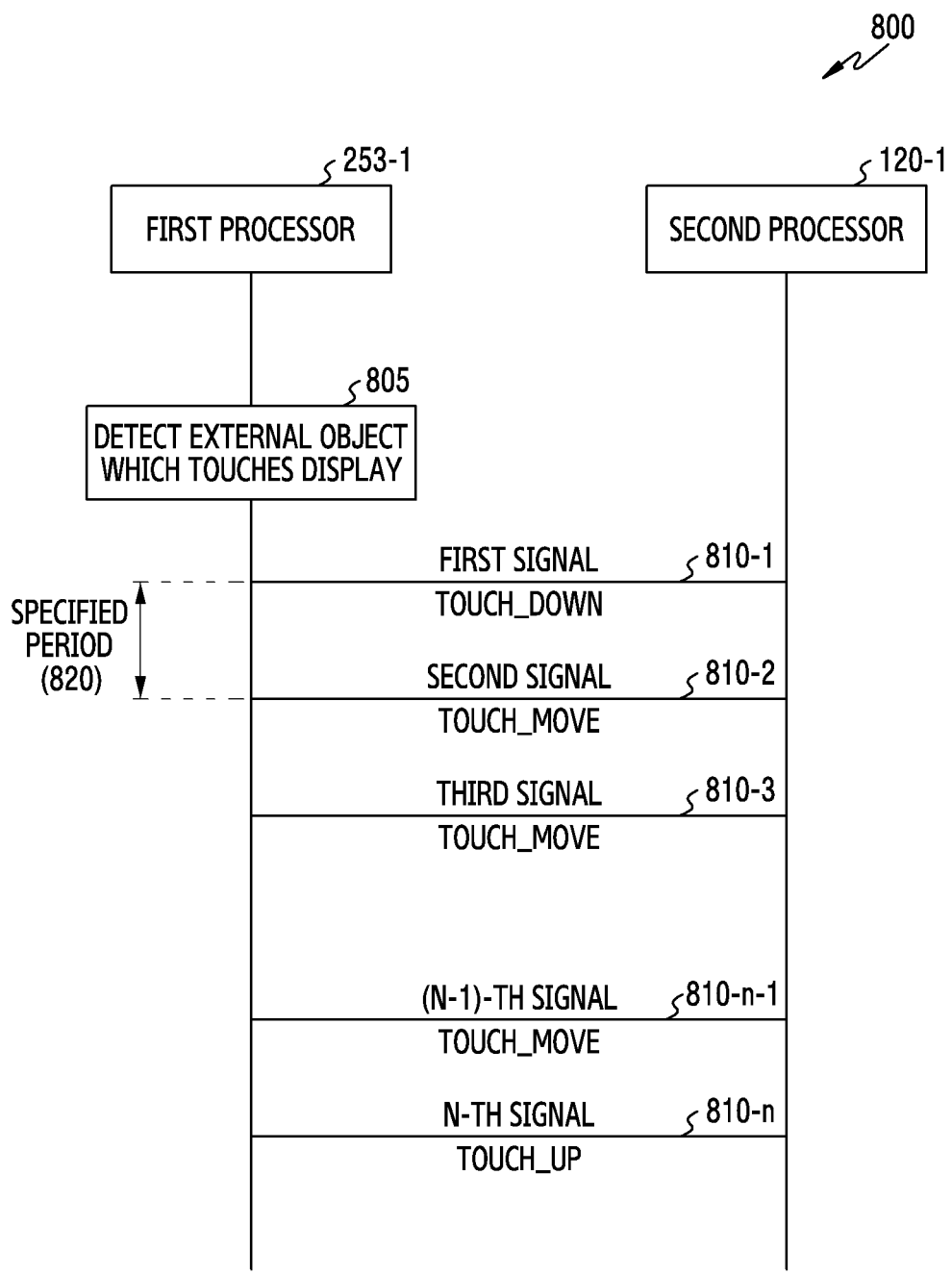
FIG. 8 is a signal flowchart illustrating a signal transferred between a first processor and second processor of an electronic device according to certain embodiments.

FIG. 8 is a signal flowchart 800 illustrating a signal transferred between a first processor 253-1 and second processor 120-1 of an electronic device according to certain embodiments. The electronic device may correspond to the electronic device 101 of FIG. 1 to FIG. 3 and FIG. 4A to FIG. 4C. The first processor 253-1 and the second processor 120-1 may respectively correspond to the touch sensor IC 253 and processor 120 of FIG. 3. The electronic device and/or first processor 253-1 of FIG. 8 may perform at least one of the operations of FIG. 5 and FIG. 7.

The signal transferred between the first processor 253-1 and the second processor 120-1 may be generated based on a specified period and/or a specified condition. For example, the signal may be generated periodically at a predetermined frequency. The signal may also be generated by the first processor 253-1, based on a condition in which the external object and the display are in contact with each other the second processor 120-1 requests the signal from the first processor 253-1).

Referring to FIG. 8, in operation 805, the first processor 253-1 may detect the external object touching the display. A touch sensor disposed in the display of the electronic device can detect the external object touching the display. The display and the touch sensor may correspond to the display 210 and touch sensor 251 of FIG. 3. In an embodiment, the first processor 253-1 may perform the operation 805 similarly to the operation 510 of FIG. 5. In an embodiment, the first processor 253-1 may perform the operation 805, based on at least one of the operations of FIG. 7 (e.g., the operations 710, 720, 703, 740, and 750 of FIG. 7).

In certain embodiments, prior to operation 805, the first processor 253-1 may periodically transmit a signal indicating no touch to the second processor 120-1. Alternatively, the second processor 120-1 can deem no touch has occurred if no signal is received from the first processor 253-1.

In an embodiment, the first processor 253-1 may notify the second processor 120-1 that the contact between the external object and the display is initiated, in response to the detecting of the external object. In an embodiment, the first processor 253-1 may notify the second processor 120-1 that it enters a first state indicating that the external object and the display are in contact. Referring to FIG. 8, after detecting the external object on the basis of the operation 805, the first processor 253-1 may transmit to the second processor 120-1 a first signal 810-1 including information notifying that the contact between the external object and the display is initiated. The information may be included in a specified region within the first signal 810-1. The information may be a specified value (e.g., a constant such as TOUCH_DOWN, ACTION_DOWN) indicating the initiation of the contact between the external object and the display.

In the first state, the first processor 253-1 according to an embodiment may obtain a coordinate of the external object, which touches the display region of the display, every specified period 820. The specified period 820 may correspond to a driving frequency of the touch sensor. In an embodiment, a size of the specified period 820 may vary depending on a change in a refresh rate of the display of the electronic device. For example, when the refresh rate of the display changes in a frequency range between 1 Hz and 120 Hz, a length of the period 820 in which the first processor 253-1 obtains the coordinate of the external object may also vary depending on the refresh rate of the display. In an embodiment, the first processor 253-1 may identify a position of the external object which touches the display and/or a change in the position of the external object every specified period 820. In the first state, the first processor 253-1 according to an embodiment may output to the second processor 120-1 a signal every specified period 820. The signal output every specified period 820 may include information indicating the position of the external object and/or the change in the position of the external object, obtained every specified period 820. The information may include a coordinate value indicating a position of the external object and/or a variation of the coordinate value, based on at least one two-dimensional coordinate space related to the display region of the display.

Referring to FIG. 8, after the specified period 820 from a time point at which the first signal 810-1 is transmitted, the first processor 253-1 may transmit a second signal 810-2 to the second processor 120-1. Hereinafter, a signal transmitted from the first processor 253-1 to the second processor 120-1 in a k-th period after detecting the external object which touches the display is referred to as a k-th signal. Each of a plurality of signals transmitted by the first processor 253-1 to the second processor 120-1 every specified period 820 may be a frame and/or frame signal transmitted by the first processor 253-1 to the second processor 120-1.

As described above, the second signal 810-2 may include information indicating a position of an external object detected after the specified period 820 elapses from the time point at which the first signal 810-1 is transmitted (e.g., in a second period) and/or a change in the position of the external object. Similarly, the first processor 253-1 may transmit a third signal 810-3 to the second processor 120-1 after the specified period 820 elapses from a time point at which the second signal 810-2 is transmitted (i.e., in a third period). The third signal 810-3 may also include information indicating the position of the external object detected after the specified period 820 elapses from the time point at which the second signal 810-2 is transmitted and/or the change in the position of the external object.

In the first state, the first processor 253-1 according to an embodiment may determine whether the contact between the external object and the display is terminated, based on at least one of an area of a contact surface between the external object and the display and/or a pressure of the external object which touches the display. For example, the first processor 253-1 may determine whether the external object is separated from the display, based on at least one of the operations of FIG. 7 (e.g., the operations 710, 720, 730, 760, and 770 of FIG. 7).

In the first state, if the external object is not separated from the display, the first processor 253-1 may transmit to the second processor 120-1 at least one signal including information notifying that the contact between the external object and the display is in progress. Referring to FIG. 7, the second signal 810-2 to (n−1)-th signal 810-n−1 transmitted after the first signal 810-1 may include at least one of information notifying that the contact between the external object and the display is in progress, information indicating that the first processor 253-1 is operating based on the first state, and/or information notifying that it is before the external object is not separated from the display. The information may be included in a specified region of each of the second signal 810-2 to the (n−1)-th signal 810-n−1. The information may be a specified value (e.g., a constant such as TOUCH_MOVE, ACTION_MOVE) indicating that the contact between the external object and the display is in progress.

In the first state, if the external object is separated from the display, the first processor 253-1 may transmit to the second processor 120-1 a signal including information notifying that the contact between the external object and the display is terminated. In an embodiment, the first processor 253-1 may notify the second processor 120-1 that it enters the second state where the external object and the display are separated. Referring to FIG. 8, in response to identifying that the external object is separated from the display, the first processor 253-1 may transmit an n-th signal 810-n including information indicating that the contact between the external object and the display is terminated. The information may be included in a specified region within the n-th signal 810-n. The information may be a specified value (e.g., a constant such as TOUCH_UP, ACTION_UP) related to the second state.

According to certain embodiments, after the contact between the external object and the display is initiated and until the contact is terminated, the first processor 253-1 may continuously identify an area of the contact surface between the external object and the display and/or a pressure of the external object which touches the display. For example, the first processor 253-1 may identify the area and/or the pressure every specified period 820. Based on the identified area and/or the identified pressure, the first processor 253-1 may obtain a time point at which the area and/or the pressure are maximum, within a time interval after the contact between the external object and the display is initiated and until the present.

In an embodiment, the first processor 253-1 may record and/or combine information related to the obtained time point with one or more signals (referring to FIG. 8, the first signal 810-1 to the n-th signal 810-n) transmitted to the second processor 120-1 every specified period 820. For example, a k-th signal generated in a k-th period after the contact between the external object and the display is initiated may include a coordinate indicating a position of the external object within a display identified in the k-th period and entire information related to the position of the external object within the display in an m-th period (1≤m≤k) in which the area between the external object and the display is maximum between the first period and the k-th period. The operation in which the first processor 253-1 records the information related to the obtained time point in the signal will be described in detail with reference to FIG. 10 to FIG. 13.

In an embodiment, the first processor 253-1 may insert information obtained from the touch sensor at the time point at which the area of the contact surface is maximum into the signal transmitted at the time point at which the area of the contact surface is maximum, and may insert only a position of the external object, which is identified at the time point, at the time point at which the area of the contact surface is not maximum. For example, the k-th signal generated in the k-th period after the contact between the external object and the display is initiated may include only a coordinate indicating the position of the external object within the display identified in the k-th period. The electronic device may insert information indicating that the area of the contact surface is maximum into the k-th signal, only when the area of the contact surface between the external object and the display is maximum in the k-th period.

The second processor 120-1 according to certain embodiments may identify a plurality of signals (e.g., the first signal 810-1 to the n-th signal 810-n) transmitted from the first processor 253-1 within a time interval in which the external object and the display are in contact with each other. In an embodiment, based on the plurality of signals transmitted every specified period 820, the second processor 120-1 may monitor the position of the external object and/or a change in the position of the external object on the basis of the specified period 820. For example, based on the k-th signal received from the first processor 253-1 in the k-th period greater than or equal to the first period and less than the n-th period, the second processor 120-1 may identify the position of the external object within the display in the k-th period.

The second processor 120-1 according to certain embodiments may identify a coordinate of the external object which touches the display from the plurality of signals at a time point at which the contact surface between the external object and the display is maximum and/or a time point at which a pressure of the external object is maximum (e.g., the m-th period). In an embodiment, based on the k-th signal, the second processor 120-1 may identify the position of the external object within the display in the m-th period (1≤m≤k) in which the area of the contact surface between the external object and the display is maximum. Based on the identified coordinate of the external object, the second processor 120-1 according to an embodiment may perform at least one function of an application being executed by the second processor 120-1. The at least one operation performed by the second processor 120-1 in relation to the at least one function will be described in detail with reference to FIG. 14. Hereinafter, a change in the area of the contact surface after the contact between the external object and the display is initiated and until the contact is terminated will be described in detail with reference to FIG. 9A and FIG. 9B.

Figure 9A:
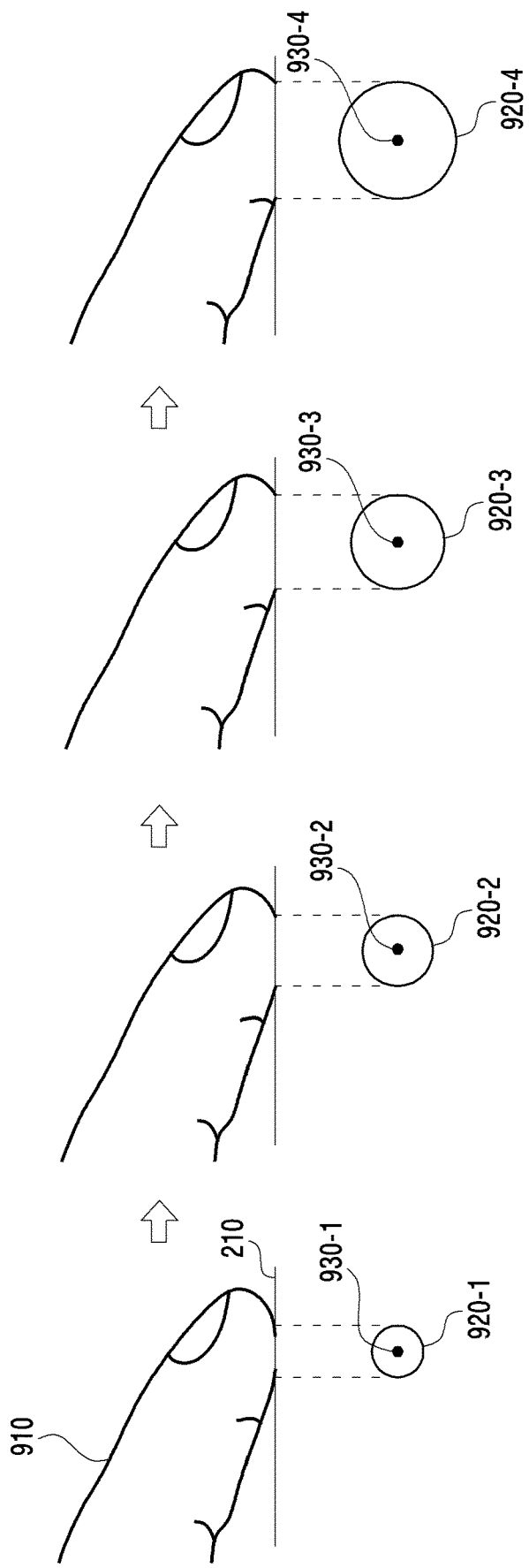
FIG. 9A to FIG. 9B are drawings illustrating a change in a contact surface between a display and an external object identified by an electronic device according to certain embodiments, and a change in a capacitance of a touch sensor, in a state where the external object touches the display to which the touch sensor is disposed.
Figure 9B:
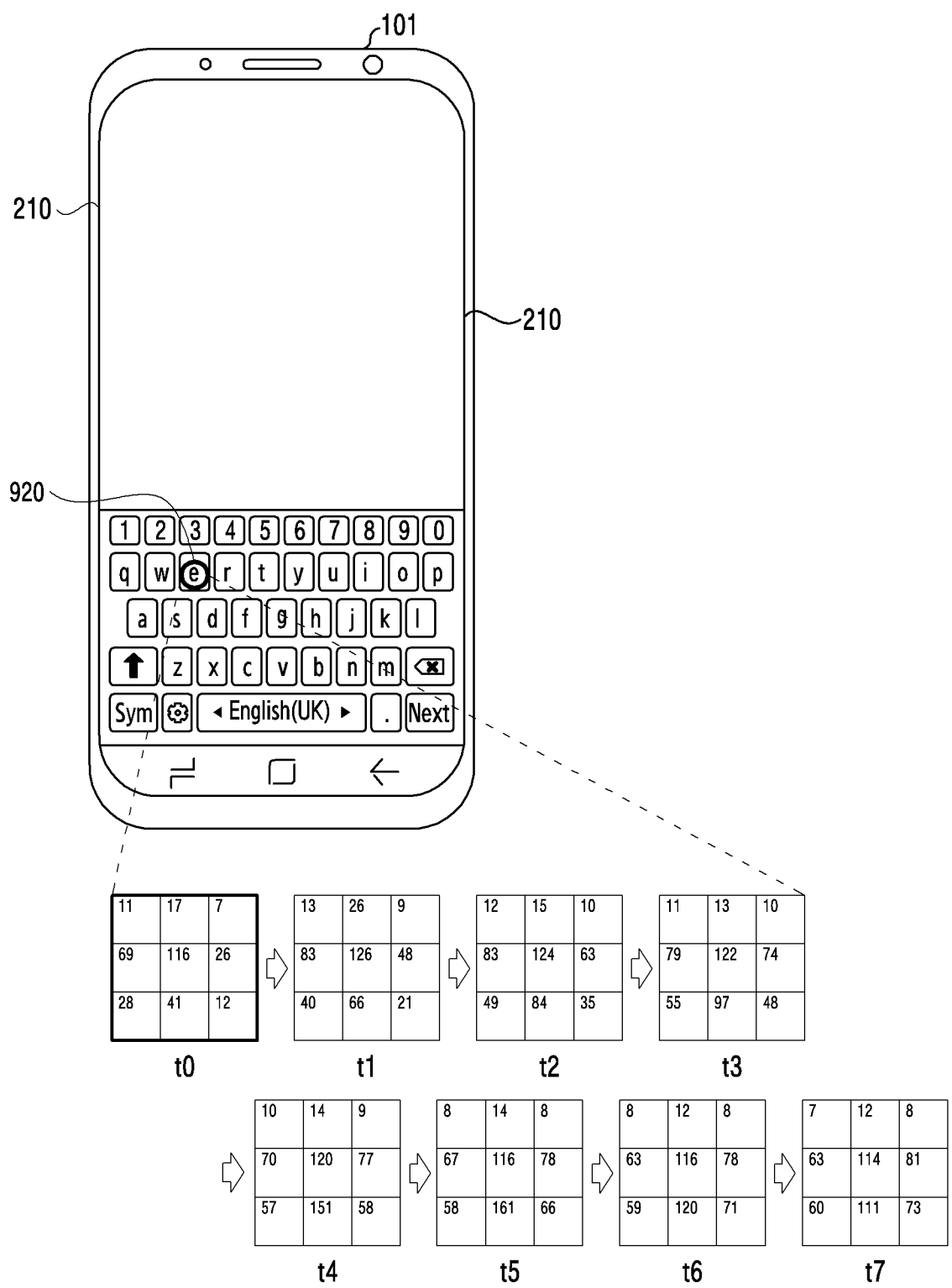

FIG. 9A and FIG. 9B are drawings illustrating a change in a contact surface 920 between a display 210 and an external object 910 identified by an electronic device 101 according to certain embodiments, and a change in a capacitance of a touch sensor, in a state where the external object 910 touches the display 210 to which the touch sensor is disposed. The electronic device 101 may correspond to the electronic device 101 of FIG. 1 to FIG. 3 and FIG. 4 to FIG. 4C. The display 210 may correspond to the display 210 of FIG. 2 and FIG. 3. The operation of the electronic device 101 described with reference to FIG. 9A and FIG. 9B may be related to at least one of the operations of FIG. 5, FIG. 7, and FIG. 8.

Referring to FIG. 9A, it is shown that contact surfaces have sizes 920-1, 920-2, 920-3, and 920-4 respectively at first, second, third, and fourth time points included in a time interval in which the external object 910 touches the display 210. An external object 910 may be a rigid object such as a stylus, or may be a non-rigid object such as a user's finger. The size and/or shape of the contact surface between the external object 910 and the display 210 may vary depending on a pressure applied to the external object 910.

As can be seen, the pad of the finger 910 deforms as the finger touches the surface from 930-1 to 930-4. Accordingly, the size of the contact surface 920 increases, 920-1 to 920-4.

The electronic device 101 according to an embodiment may include at least one hardware component for identifying the area, size, and/or shape of the contact surface of the external object 910 which touches the display 210. For example, the electronic device 101 may include the touch circuitry 250 and/or touch sensor IC 253 (or the first processor) including the touch sensor 251 of FIG. 2 to FIG. 3. The electronic device 101 may identify a capacitance measured in each of a plurality of cells within the display 210 from information of the touch sensor. The capacitance measured in each of the plurality of cells may change depending on the contact surface between the external object 910 and the display 210. Referring to FIG. 9, the electronic device 101 may identify the sizes 920-1, 920-2, 920-3, and 920-4 of the contact surface respectively at the first, second, third, and fourth time points, based at least in part on the identified capacitance. An interval between two adjacent time points at the first to fourth time points may correspond to a period (e.g., the specified period 820 of FIG. 8) related to an operation of the touch sensor.

In an embodiment, the electronic device 101 may obtain a position of the external object 910 which touches the display 210, based on the identified capacitance. The position of the external object 910 may imply one coordinate selected from among coordinates of the display 210 included in the contact surface between the display 210 and the external object 910. The selected coordinate may be an instant coordinate indicating the position of the external object 910 at an instant of identifying the contact surface. The electronic device 101 according to an embodiment may determine a center of mass of the contact surface as the position of the external object 910 and/or the coordinate corresponding to the external object 910 (e.g., the representative coordinate).

Referring to FIG. 9A, it is shown that coordinates 930-1, 930-2, 930-3, and 930-4 are related to the external object 910 identified by the electronic device 101 respectively at first to fourth time points on the basis of the identified capacitance. The coordinates 930-1, 930-2, 930-3, and 930-4 may correspond to centers of mass of the contact surfaces identified respectively at the first to fourth time points. The electronic device 101 may generate a signal (e.g., the first signal 810-1 and n-th signal 810-n of FIG. 8) including the identified position of the external object 910. For example, the electronic device 101 may generate a signal including information indicating the coordinates 930-1, 930-2, 930-3, and 930-4 respectively at the first to fourth time points. The signal may be transmitted and/or received between a plurality of hardware components (e.g., the first processor 253-1 and second processor 120-1 of FIG. 8) included in the electronic device 101.

The electronic device 101 according to certain embodiments may determine any one of positions of the external object 910 identified at the plurality of time points, as the representative coordinate of the external object 910 within a time interval in which the external object 910 and the display 210 are in contact with each other, based on the sizes of the contact surface between the display 210 and the external object 910 identified at the plurality of time points.

Referring to FIG. 9A, the electronic device 101 may determine any one of the coordinates 930-1, 930-2, 930-3, and 930-4 respectively at the first to fourth time points as the representative coordinate of the position of the external object 910, based on the sizes 920-1, 920-2, 920-3, and 920-4 of the contact surface respectively at the first to fourth time points. For example, since the size 920-4 of the contact surface at the fourth time point is greater than the sizes 920-1, 920-2, and 920-3 of the contact surface at the remaining time points, the electronic device 101 may determine the instant coordinate 930-4 measured at the fourth time point as the representative coordinate of the external object 910.

The electronic device 101 according to certain embodiments may control a UI displayed within the display 210 on the basis of the representative coordinate, and thus may more accurately control the UI while maintaining responsiveness to the touch input made by the external object 910. The electronic device 101 may display at least one visual element which enables intuitive control by the touch input within the UI. The visual element may include, for example, at least one of a button, an icon, a text, an image, a video, an animation, a number picker, a progress bar, a check box and/or a radio button. For example, when a plurality of visual elements are displayed densely, the electronic device 101 may relatively accurately identify a user input which selects any one of the plurality of visual elements by using the representative coordinate.

Referring to FIG. 9B, a UI displayed within the display 210 by the electronic device 101 is shown for example. The electronic device 101 may display a UI for inputting a text, based on a plurality of buttons, such as a soft keyboard, a virtual keyboard, and/or an on-screen keyboard, within the display 210. When a user touches part of the UI within the display 210 by using a finger (e.g., the external object 910 of FIG. 9A), the electronic device 101 may identify the contact surface 920 between the finger and the display 210 by using a plurality of cells of a touch sensor.

Referring to FIG. 9B, it is shown that the touch sensor disposed in the display 210 has the contact surface 920 and a part 940. The part 940 of the touch sensor may include one or more cells, and it is assumed in the example of FIG. 9B that 9 cells are included in the part 940. In an embodiment, the electronic device 101 may obtain sensor data, which is related to a capacitance and/or pressure measured in each of the plurality of cells, from the plurality of cells. Referring to FIG. 9B, numeric values in the part 940 of the touch sensor are sensor data measured in the respective cells included in the part 940, and may correspond to, for example, a sensitivity related to the capacitance measured in the cell.

Referring to FIG. 9B, it is shown that numeric values are obtained by the electronic device 101 from the plurality of cells included in the part 940 of the touch sensor at a plurality of time points t0 to t7 within a time interval in which a finger and the display 210 are in contact. A change in the area, size, and/or shape of the contact surface 920 may result in a change in a distribution of a numeric value output in each of the plurality of cells of the touch sensor including the part 940. For example, among the plurality of cells of the touch sensor, a position of a maximum value may vary depending on the change in the contact surface 920. The obtained numeric values may be used to identify a coordinate of a finger which touches the display 210 (e.g., a coordinate of a center of mass of the contact surface 920) and/or a size of the contact surface 920. In an embodiment, the electronic device 101 may identify the coordinate of the finger at each of the plurality of time points t0 to t7.

The electronic device 101 according to an embodiment may identify the size of the contact surface 920 at each of the plurality of time points t0 to t7. When the numeric values are in proportion to the area and/or pressure of the contact surface between the cell and the finger, the electronic device 101 may obtain the area of the contact surface between the display 210 and the finger, based on a sum of numeric values included at least in the part 940 of the touch sensor. In the example of FIG. 9B, since the sum of numeric values at t0 to t7 are respectively 312, 432, 475, 509, 566, 576, 535, and 529, the electronic device 101 may identify that the size of the contact surface 920 is maximum at t5. In an embodiment, the electronic device 101 may identify a time point at which the size of the contact surface 920 is maximum, based on the number of cells which output a numeric value exceeding a threshold (e.g., a valid sensitivity). For example, when the number of cells which output the numeric value exceeding the threshold is maximum at t5, the electronic device 101 may determine that the size of the contact surface 920 is maximum at t5.

The electronic device 101 according to certain embodiments may relatively accurately identify a context, UI, and/or visual element selected by a user, based on a coordinate identified at the time point t5 at which the size of the contact surface 920 is maximum among the plurality of time points. When the user touches a specific button (a key 'e') in an on-screen keyboard as shown in FIG. 9B, the electronic device 101 may identify a button touched by the user, based on the coordinate identified at the time point t5 at which the size of the contact surface 920 is maximum.

For example, when a coordinate identified at the remaining time points other than the time point t5 and the coordinate identified at the time point t5 are included in different buttons, the electronic device 101 may determine a button corresponding to the coordinate identified at the time point t5 at which the size of the contact surfaced 920 is maximum, as the button touched by the user. Since the electronic device 101 identifies not only a time point at which the contact between the finger and the display 210 is initiated and a time point at which the contact is terminated but also a time point at which the area of the contact surface is maximum in size, the electronic device 101 may more accurately identify a touch input. For example, the electronic device 101 may prevent misrecognition of the touch input by using the time point at which the size of the contact surface 920 is maximum. In case of FIG. 9B, the electronic device 101 may reduce typos which may occur in the on-screen keyboard.

Figure 10:
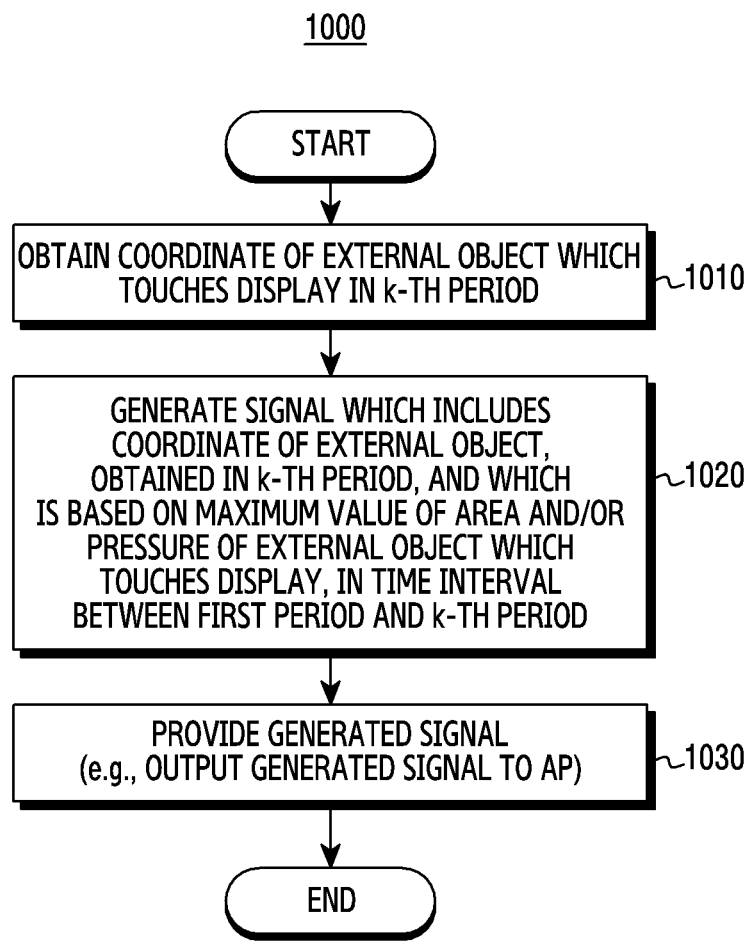
FIG. 10 is a flowchart illustrating an operation in which an electronic device according to certain embodiments generates a signal every specified period in a state where an external object touches a touch sensor.

FIG. 10 is a flowchart 1000 illustrating an operation in which an electronic device according to certain embodiments generates a signal every specified period in a state where an external object touches a touch sensor. The electronic device may correspond to the electronic device 101 of FIG. 1 to FIG. 3 and FIG. 4A to FIG. 4C. The touch sensor may correspond to the touch sensor 251 disposed in the display 210 of FIG. 2 and FIG. 3. Operations of FIG. 10 may be performed by, for example, the touch circuitry 250 and/or touch sensor IC 253 (or the first processor) disposed in the display 210 of FIG. 2 and FIG. 3.

The operations of FIG. 10 may be based at least one of the operations of FIG. 7 and FIG. 8, or may be performed similarly thereto. For example, the electronic device may perform at least one of the operations of FIG. 10, in a state where an external object which touches a display is identified (e.g., the first state of FIG. 7). Within a time interval in which the electronic device identifies a contact between the external object and the display, the electronic device may perform at least one of the operations of FIG. 10 every specified period. The specified period may correspond to a specified period (e.g., the specified period 820 of FIG. 8) in order for the electronic device to monitor a position of the external object within the display. Hereinafter, an operation of the electronic device in a k-th period corresponding to any one of first to n-th periods within the time interval will be described.

Referring to FIG. 10, in operation 1010, the electronic device according to certain embodiments may obtain a coordinate of the external object which touches the display in the k-th period. In an embodiment, the electronic device may obtain the coordinate of the external object, based on sensor data identified from a plurality of cells, similarly to those described with reference to FIG. 9A and FIG. 9B. In an embodiment, the electronic device may identify a coordinate of the external object and/or an area and/or pressure of a contact surface between the display and the external object in the k-th period.

Referring to FIG. 10, in operation 1020, the electronic device according to certain embodiments may generate a signal which includes the coordinate of the external object, obtained in the k-th period, and which is based on a maximum value of the area and/or pressure of the external object which touches the display, in the time interval between the first period and the k-th period. In an embodiment, the electronic device may identify a time point between first and k-th periods in which the area and/or the pressure are maximum. Since the electronic device repetitively performs at least one of the operations of FIG. 10 according to the first to n-th periods within the time interval, a maximum value identified by the electronic device on the basis of the operation 1020 may be changed. For example, when the area and/or pressure of the external object which touches the display gradually increases, the maximum value identified by the electronic device on the basis of the operation 1020 may gradually increase according to the first to n-th period.

The electronic device according to certain embodiments may generate a signal including the coordinate of the external object in the k-th period, obtained based on the operation 1010. The signal is based on a time point at which the area and/or pressure of the external object between the first and k-th periods are maximum. In operation 1030, the electronic device may provide the generated signal to a second processor from a first processor which generates the signal. The signal may further include information for identifying the coordinate of the external object, obtained at the time point between the first and k-th periods in which the area and/or pressure of the external object touching the display are maximum, as well as the coordinate of the external object, obtained in the k-th period. A format of the information may include at least one of a flag indicating whether the k-period is a time point at which the area and/or the pressure are maximum, a coordinate value obtained at the time point, and a combination of sensor data obtained from the touch sensor at the time point. Hereinafter, a structure of the signal generated by the electronic device will be described in detail with reference to FIG. 11 to FIG. 13.

Figure 11:
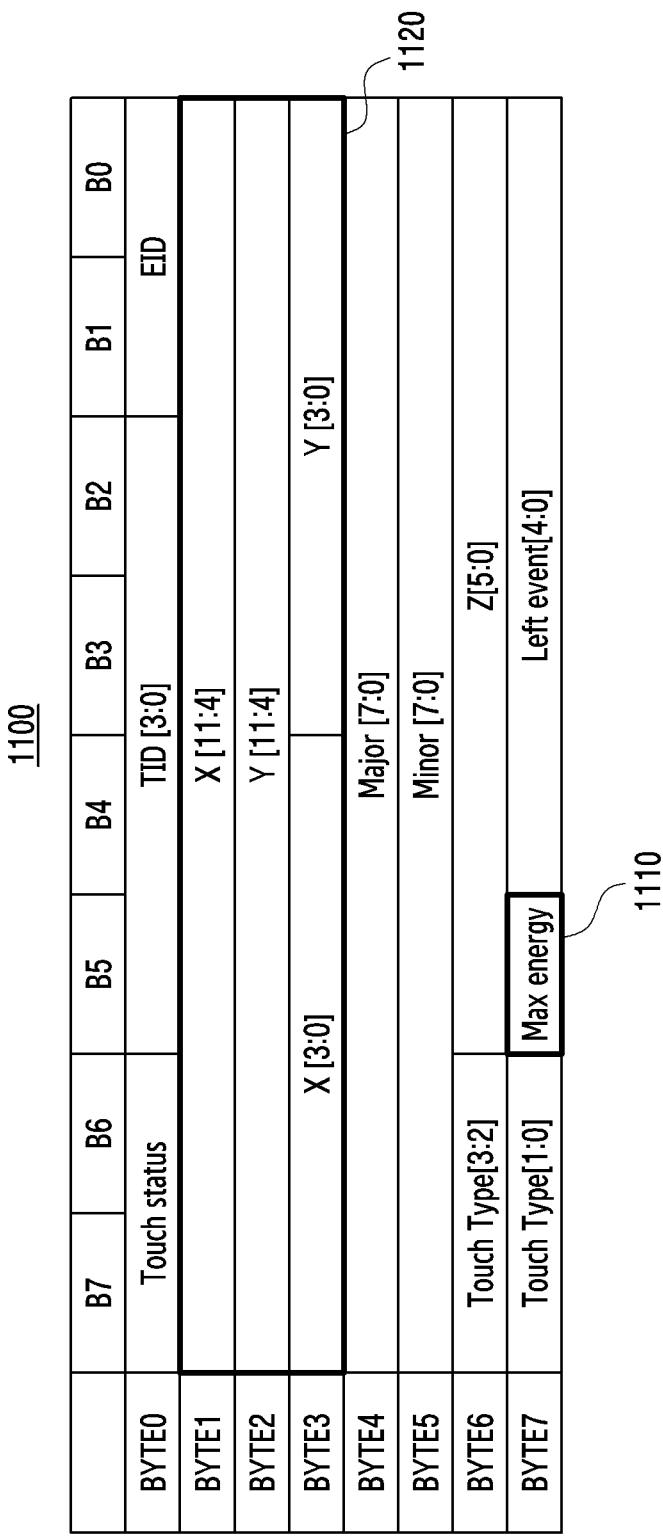
Figure 12:
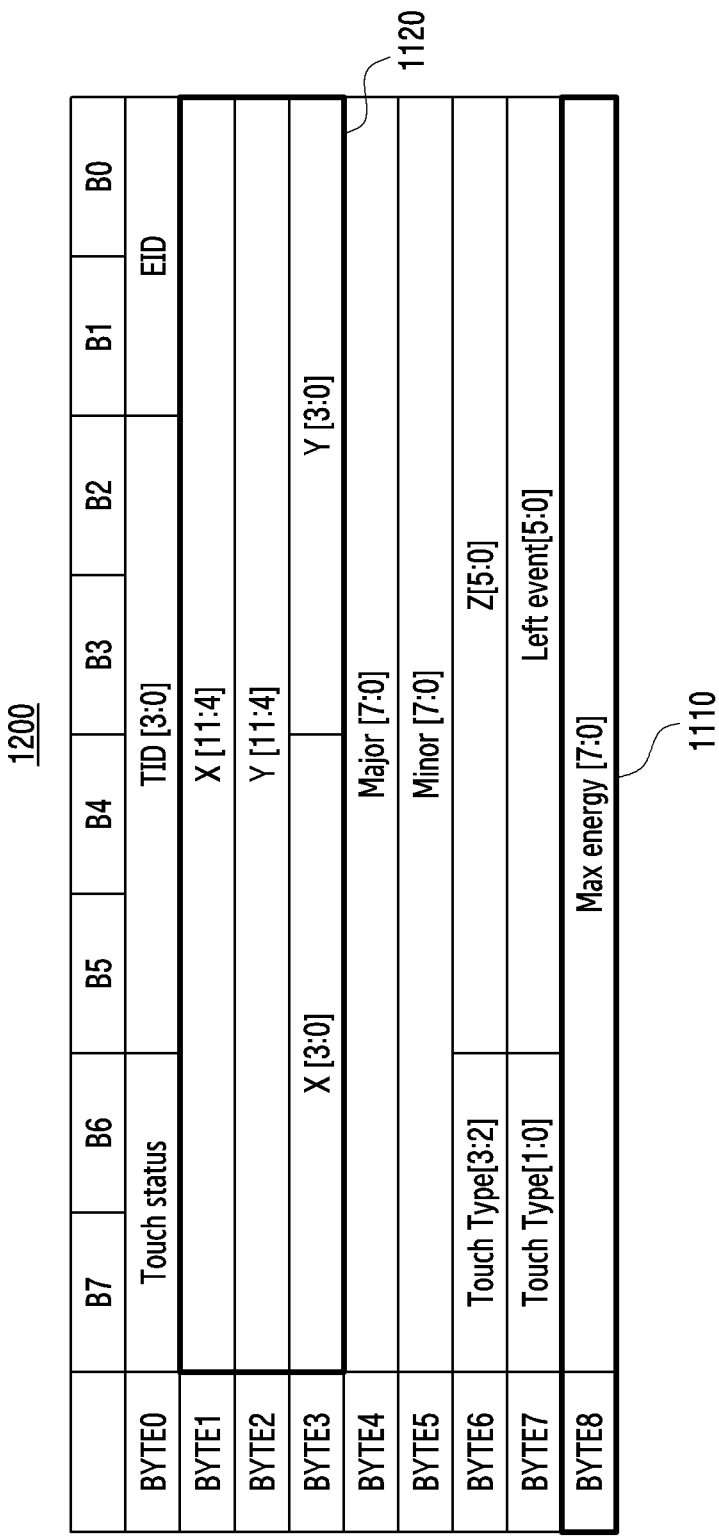

FIG. 11 to FIG. 13 are diagrams illustrating structures 1100, 1200, and 1300 of a signal generated by an electronic device according to certain embodiments. The electronic device of FIG. 11 to FIG. 13 may correspond to the electronic device 101 of FIG. 1 to FIG. 3 and FIG. 4A to FIG. 4C. The operation of the electronic device 101 described with reference to FIG. 11 to FIG. 13 may be related to at least one of the operations of FIG. 5, FIG. 7, and FIG. 10. The operation of the electronic device 101 described with reference to FIG. 11 to FIG. 13 may be performed by a first processor (e.g., the touch sensor IC 253 of FIG. 3) and second processor (e.g., the processor 120 of FIG. 3) included in the electronic device 101. In an embodiment, the signals 1100, 1200, and 1300 of FIG. 11 to FIG. 13 may be generated by the first processor of the electronic device, for example, based on the operation 530 of FIG. 5 and/or the operation 1030 of FIG. 10. At least one of the signals 1100, 1200, and 1300 generated by the first processor may be transmitted to the second processor.

The electronic device and/or first processor according to certain embodiments may obtain information related to at least one external object which touches on a surface (e.g., the display 210 of FIG. 2 and FIG. 3), based on information received from the touch sensor every specified period. The obtained information may be processed based on a format which can be identified by the first processor and/or second processor of the electronic device.

Referring to FIG. 11 to FIG. 13, information included in the signal output from the first processor according to an embodiment and a format and/or arrangement in the signal of the information are shown according to bits (i.e., B0 to B7) and bytes (i.e., BYTE0 to BYTE7). In an embodiment, the first processor of the electronic device may transmit bits of the BYTE0 to the second processor in the order of B0 to B7 and then transmit bits of the BYTE1 in a similar order, thereby transmitting a plurality of bits in the order of BYTE0 to BYTE7. The transmitting of the plurality of bits from the first processor to the second processor may include transmitting the plurality of bits directly between the first processor and the second processor or storing the plurality of bits in a memory (e.g., at least part of the memory 130 of FIG. 1 to FIG. 3) accessible by both the first processor and the second processor.

In an embodiment, the first processor may obtain a state (Touch Status), identifier (TID), and/or type (Touch Type) of the external object which touches the display, as information related to the external object. The first processor may indicate the obtained state of the external object as a 2-bit value in a specified field and/or part (e.g., B6 and B7 of the BYTE0) of the signal. The first processor may store the obtained type of the external object in a divided manner in two specified parts (e.g., B6 and B7 of the BYTE6 and B6 and B7 of the BYTE7) of the signal. For example, the first processor may record a part [3:2] of a 4-bit value indicating the type of the external object in B6 to B7 of the BYTE6 and the remaining part [1:0] other than the part in B6 and B7 of the BYTE7.

For example, a state (e.g., None, Press, Move, and/or Release) of the external object determined by the first processor at a time point at which the signal is generated may be recorded in the field (Touch Status) indicating the state of the external object. The identifier (Touch ID) of the external object corresponding to the signal may be recorded in the identifier field (the TID). Information (e.g., Normal, Hover, Glove, Stylus, Palm) indicating the type of the external object identified by the first processor may be recorded in the type field (Touch Type). A numeric value and/or sensitivity of the touch sensor related to the externa object may be recorded in a Z-field. A length of a major axis and a length of a minor axis of the contact surface between the external object and the display may be recoded in each of a major field and a minor field. The number of remaining events may be recoded in a left-event field.

In an embodiment, the first processor may obtain a coordinate of a position of the external object within the display, measured at a time point and/or instance of generating a signal, as information related to the external object. The first processor may record the obtained coordinate in a part 1120 of the signal. Referring to FIG. 11 to FIG. 13, the first processor may record an x-axis of the obtained coordinate in each of the entirety (8 bits) of the BYTE1 and a part (4 bits) of the BYTE3, and may record a y-axis of the obtained coordinate in each of the entirety (8 bits) of the BYTE2 and a part (4 bits) of the BYTE4. For example, a part [11:4] of the 12 bits indicating the x-coordinate may be recorded in the entirety (8 bits) of the BYTE1, and the remaining parts [3:0] of the 12 bits may be recorded in a part of BYTE3. In an embodiment, the first processor may record a distance (a Z-field of B0 to B5 of the BYTE6 of FIG. 11 to FIG. 13) between the external object and the display. The distance may be used to process a user input based on the external object which hovers over the display.

The first processor according to certain embodiments may identify a time point at which the area of the contact surface of the external object which touches the display is maximum and/or a position of the external object within the display at the time point, for example, based on the operations of FIG. 10. The first processor may insert information related to the time point and/or the identified position, into a signal to be transmitted to the second processor.

Referring to FIG. 11, the first processor according to an embodiment may record a specified value indicating whether the signal corresponds to the time point at which the area of the contact surface of the external object is maximum, in a specified part 1110 of the signal, for example, in a Max energy bit field corresponding to B5 of the BYTE7. A format of the specified value may be, for example, a Boolean value having a size of 1 bit. For example, if the signal corresponds to the time point at which the area of the contact surface of the external object is maximum, the first processor may record a specified value (e.g., logic One or High signal) corresponding to True in the part 1110 of the signal. For example, if the signal does not correspond to the time point at which the area of the contact surface is maximum, the first processor may record a specified value (e.g., logic Zero or Low signal) corresponding to False in the part 1110 of the signal.

In an embodiment, the first processor may insert information indicating the time point at which the area of the contact surface of the external object is maximum into the part 1110 such as the Max energy bit field, based on a plurality of parameters (e.g., sensitivities of FIG. 9B) identified in each of the plurality of cells included in the touch sensor. When each of the plurality of parameters changes in proportion to the area of the contact surface between a corresponding cell and the external object, the first processor may insert and output a specified value indicating whether a position of the external object identified every specified period is a position measured at a time point at which a change in the plurality of parameters is maximum, in the part 1110 of the signal. When the plurality of parameters respectively indicate a change in capacitance of the plurality of cells, the first processor may combine a parameter indicating whether the change in the capacitance is maximum at a time point of obtaining a coordinate related to the external object included in another part 1120 of the signal, in the part 1110 of the signal.

Table 1 shows an example of information recorded by the first processor according to an embodiment in a signal which is based on the structure 1100 of FIG. 11, in an exemplary situation in which a sum of a plurality of parameters measured from the touch sensor changes.

TABLE 1

| Time point | Sum of the plurality of parameters | Touch Status field | Max energy bit field |
|---|---|---|---|
| 1 | 0 | NULL | Don't care |
| 2 | 30 | | |
| 3 | 60 | | |
| 4 | 100 | Press | 1 |
| 5 | 110 | Move | 1 |
| 6 | 105 | Move | 0 |
| 7 | 120 | Move | 1 |
| 8 | 115 | Move | 0 |
| 9 | 100 | Move | 0 |

TABLE 1-continued

| Time point | Sum of the plurality of parameters | Touch Status field | Max energy bit field |
|---|---|---|---|
| 10 | 70 | Release | 0 |
| 11 | 50 | | |
| 12 | 20 | | |
| 13 | 0 | | |

Referring to Table 1, it is shown the sum of the plurality of parameters identified by the first processor at each of time points from a $1^{st}$ time point to a $13^{th}$ time point according to a specified period. The sum of the plurality of parameters may be in proportion to the area of the contact surface of the external object which touches the touch sensor and/or the display. The first processor may identify a $4^{th}$ time point at which the area of the contact surface between the external object and the display exceeds a specified first threshold (e.g., the first threshold 620 of FIG. 6), for example, based on the operations of FIG. 7. The signal transmitted by the first processor to the second processor at the $4^{th}$ time point may include a coordinate of the external object identified at the $4^{th}$ time point in the part 1120, and may include a specified value (a specified value such as Press, TOUCH_DOWN, and/or ACTION_DOWN) notifying initiation of the contact between the external object and the display in the touch status field. At the $4^{th}$ time point of determining that the contact between the external object and the display is initiated, the time point at which the area of the contact surface of the external object is maximum is the $4^{th}$ time point itself. Therefore, the first processor may record a specified value '1' indicating that it is the time point at which the area of the contact surface of the external object is maximum, in the part 1110 of the signal corresponding to the Max energy bit field.

After the $4^{th}$ time point, the first processor may identify the sum of the plurality of parameters indicating the area of the contact surface of the external object from the touch sensor every specified period. Until the sum is less than the specified second threshold (e.g., the second threshold 630 of FIG. 6) for determining termination of the contact between the display and the external object, the first processor may trace a position of the external object within the display, based on the identified plurality of parameters. In a state where the sum is less than the second threshold, the touch status field in at least one signal transmitted to the second processor may include a specified value (Move, TOUCH_MOVE, and/or ACTION_MOVE) notifying that the contact between the external object and the display is in progress.

At a $5^{th}$ time point elapsed by a specified period from the $4^{th}$ time point, the first processor may identify a sum 110 of a plurality of parameters indicating the area of the contact surface of the external object from the touch sensor. In response to identifying the sum 110 exceeding the specified second threshold, the first processor may obtain a position of the external object within the display, based on the plurality of parameters identified at the $5^{th}$ time point. The first processor may record the obtained position in the specified part 1120 of the signal.

The first processor according to an embodiment may compare the sum 110 of the plurality of parameters identified at the $5^{th}$ time point with a sum 100 of the plurality of parameters at the time point (i.e., the $4^{th}$ time point) at which the area of the contact surface of the external object is maximum prior to the $5^{th}$ time point, based on the operation of FIG. 10. Since the sum 110 of the $5^{th}$ time point exceeds the sum 100 of the 4$^{th}$ time point, the first processor may record the specified value '1' indicating that it is the time point at which the area of the contact surface of the external object is maximum, in the part 1110 of the signal corresponding to the Max energy bit field.

At a 6$^{th}$ time point elapsed by a specified period from the 5$^{th}$ time point, the first processor may identify a sum 105 of a plurality of parameters indicating the area of the contact surface of the external object from the touch sensor. In response to identifying the sum 105 exceeding the specified second threshold, the first processor may obtain a position of the external object within the display, based on the plurality of parameters identified at the 6$^{th}$ time point. The first processor may record the obtained position in the specified part 1120 of the signal.

The first processor according to an embodiment may compare the sum 105 of the plurality of parameters identified at the 6$^{th}$ time point with the sum 110 of the plurality of parameters at the time point (i.e., the 5$^{th}$ time point) at which the area of the contact surface of the external object is maximum prior to the 6$^{th}$ time point, based on the operation of FIG. 10. Since the sum 105 of the 6$^{th}$ time point is less than the sum 110 of the 5$^{th}$ time point, the first processor may record the specified value '0' indicating that the area of the contact surface of the external object is not maximum at the 6$^{th}$ time point at which the position of the external object is obtained, in the part 1110 of the signal corresponding to the Max energy bit field.

As described above, the first processor may determine whether the position of the external object within the display and the area of the contact surface of the external object are maximum every specified period after the 4$^{th}$ time point. For example, until the sum of the plurality of parameters is less than the second threshold, the first processor may determine whether the position of the external object within the display and the area of the contact surface of the external object are maximum every specified period. Referring to Table 1, the first processor may identify a 10$^{th}$ time point at which the sum of the plurality of parameters is less than the second threshold, for example, based on the operations of FIG. 7.

At the 10$^{th}$ time point, in response to identifying that a sum 70 of the plurality of parameters is less than the second threshold, the first processor may transmit to the second processor a signal including a coordinate of the external object identified at the 10$^{th}$ time point and including a specified value (e.g., Release, TOUCH_UP, and/or ACTION_UP) notifying that the contact between the external object and the display is terminated in the touch status field. The part 1110 of the signal corresponding to the Max energy bit field of the signal transmitted at the 10$^{th}$ time point may include a specified value '0' indicating that the area of the contact surface of the external object is not maximum, since the sum 70 of the plurality of parameters identified at the 10$^{th}$ time point is less than a sum 120 of the plurality of parameters of the time point (referring to Table 1, the 7$^{th}$ time point) prior to the 10$^{th}$ time point at which the area of the contact surface of the external object is maximum.

In response to receiving from the first processor a plurality of signals including a value shown in Table 1 and based on the structure 1100 of FIG. 11 at the 4$^{th}$ time point to the 10$^{th}$ time point, the second processor according to an embodiment may identify the time point (the 7$^{th}$ time point) at which the area of the contact surface between the external object and the display is maximum, based on the part 1110 corresponding to the Max energy bit field in each of the plurality of signals. Based on the part 1120 of the signal received at the 7$^{th}$ time point, the second processor may identify a coordinate of the external object within the display at the 7$^{th}$ time point.

Referring to FIG. 12, the first processor according to an embodiment may record information indicating the area of the contact surface of the external object identified from the touch sensor at a time point corresponding to the signal, in the specified part 1210 of the signal, for example, in the energy field and/or Max energy field corresponding to the entirety (8 bits) of the BYTE8. For example, in the exemplary situation of Table 1, the first processor may record the sum of the plurality of parameters obtained at corresponding time points, in the part 1210 of the plurality of signals transmitted at the 4$^{th}$ time point to the 10$^{th}$ time point. In this case, the plurality of signals transmitted respectively at the 4$^{th}$ time point to the 10$^{th}$ time point may include the sum of the plurality of parameters obtained respectively at the 4$^{th}$ time point to the 10$^{th}$ time point.

In an embodiment, the first processor may record the sum of the plurality of parameters obtained at the time point at which the area of the contact surface of the external object is maximum within the time point corresponding to the signal from the time point at which the contact between the external object and the display is initiated, in the part 1210 of the signal. For example, in the exemplary situation of Table 1, at the 5$^{th}$ time point, the first processor may transmit a signal including the sum 110 of the plurality of parameters identified at the 5$^{th}$ time point in the part 1210 of the signal. In the exemplary situation of Table 1, the first processor may transmit a signal including the sum 120 of the plurality of parameters identified at the 5$^{th}$ time point in the part 1210 of the signal. In the exemplary situation of Table 1, at an 8$^{th}$ time point, the first processor may transmit a signal including the sum 120 of the plurality of parameters identified at the 7$^{th}$ time point in the part 1210 of the signal.

In response to receiving the plurality of signals based on the structure 1200 of FIG. 12, the second processor according to an embodiment may identify the time point at which the area of the contact surface between the external object and the display is maximum, based on the part 1210 corresponding to the Max energy field in each of the plurality of signals. Based on the part 1120 of the signal received at the identified time point, the second processor may identify the coordinate of the external object within the display at the identified time point.

Referring to FIG. 13, the first processor according to an embodiment may record the coordinate of the external object, obtained at the time point at which the area of the contact surface of the external object is maximum in a specified part 1310 of the signal. For example, the first processor may record an X-coordinate of the external object at the time point in the entirety of the BYTE8 or parts B4 to B7 of the BYTE10, and may record a Y-coordinate of the external object at the time point in the entirety of the BYTE9 and parts B0 to B3 of the BYTE10. In this case, the signal transmitted from the first processor to the second processor may include the part 1120 in which a coordinate of an external object, obtained at a specific time point corresponding to the signal, and the part 1310 in which a coordinate of an externa object, obtained at a time point at which the area of the contact surface of the external object is maximum, at the specific time point after the contact of the external object is initiated.

Table 2 shows an example of information recorded by the first processor according to an embodiment in the parts 1120 and 1310 of the signal which is based on the structure 1300 of FIG. 13, in an exemplary situation in which a sum of a plurality of parameters measured from a touch sensor is changed.

TABLE 2

| Time point | Sum of the plurality of parameters | External object of coordinates in which the parts 1120 of the signal are recorded | External object of coordinates in which the parts 1310 of the signal are recorded |
|---|---|---|---|
| 1 | 0 | Don't care | Don't care |
| 2 | 30 | Don't care | Don't care |
| 3 | 60 | Don't care | Don't care |
| 4 | 100 | the coordinates of the $4^{th}$ time point | the coordinates of the $4^{th}$ time point |
| 5 | 110 | the coordinates of the $5^{th}$ time point | the coordinates of the $5^{th}$ time point |
| 6 | 105 | the coordinates of the $6^{th}$ time point | the coordinates of the $5^{th}$ time point |
| 7 | 120 | the coordinates of the $7^{th}$ time point | the coordinates of the $7^{th}$ time point |
| 8 | 115 | the coordinates of the $8^{th}$ time point | the coordinates of the $7^{th}$ time point |
| 9 | 100 | the coordinates of the $9^{th}$ time point | the coordinates of the $7^{th}$ time point |
| 10 | 70 | the coordinates of the $10^{th}$ time point | the coordinates of the $7^{th}$ time point |
| 11 | 50 | Don't care | Don't care |
| 12 | 20 | Don't care | Don't care |
| 13 | 0 | Don't care | Don't care |

Referring to Table 2, at time points (the $4^{th}$ time point, the $5^{th}$ time point, and the $7^{th}$ time point) at which the area of the contact surface between the display and the external object is maximum, coordinates in which the parts 1120 and 1310 of the signal are recorded may be identical to each other. At the remaining time points other than these time points, coordinates in which the parts 1120 and 1310 of the signal are recorded may be different from each other. The second processor which receives the signal which is based on the structure 1300 of FIG. 13 may identify, from one signal, both a position of an external object at a time point corresponding from the signal and a position of the external object at a time point at which the area of the contact surface is maximum. Hereinafter, an operation of the second processor which receives a signal including information related to a time point at which the position of the external object and the area of the contact surface are maximum similarly to the structure 1100, 1200, and 1300 of FIG. 11 to FIG. 13 will be described in detail.

Figure 14:
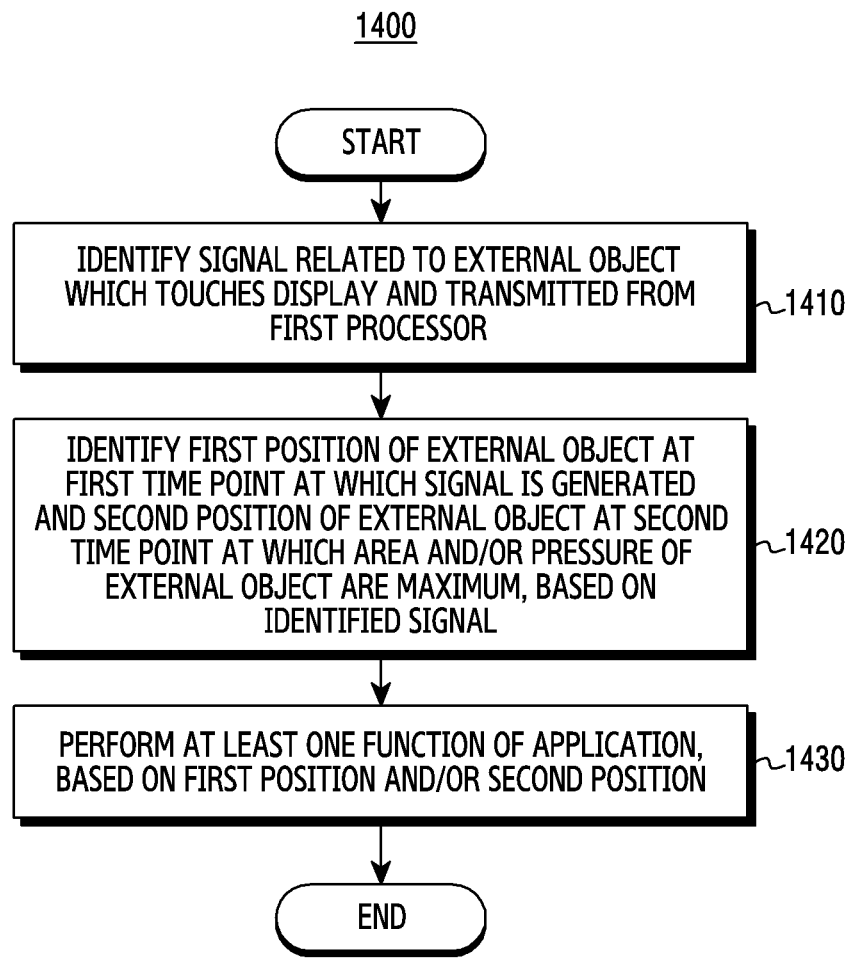
FIG. 14 is a flowchart illustrating an operation in which a second processor coupled to a first processor of a touch sensor processes a plurality of signals transmitted from the first processor, in an electronic device according to certain embodiments.

FIG. 14 is a flowchart 1400 illustrating an operation in which a second processor coupled to a first processor of a touch sensor processes a plurality of signals transmitted from the first processor, in an electronic device according to certain embodiments. The electronic device may correspond to the electronic device 101 of FIG. 1 to FIG. 3 and FIG. 4A to FIG. 4C. The touch sensor may correspond to the touch sensor 251 disposed in the display 210 of FIG. 2 and FIG. 3. The first processor and the second processor may respectively correspond to the touch sensor IC 253 and processor 120 of FIG. 3 and/or FIG. 8.

Referring to FIG. 14, in operation 1410, the second processor of the electronic device according to certain embodiments may identify a signal related to an external object which touches a display and transmitted based on a specified period from the first processor. The first processor according to an embodiment may generate a signal including information related to a position of the external object within the display, for example, based on at least one of the operations of FIG. 5, FIG. 7, and/or FIG. 10. The generated signal may include the information related to the position of the external object, based on at least one of the structures 1100, 1200, and 1300 of FIG. 11 to FIG. 13. The second processor according to an embodiment may receive the signal every specified period from the first processor.

Referring to FIG. 14, in operation 1420, the second processor of the electronic device according to certain embodiments may identify a first position of the external object at a first time point at which the signal is generated and a second position of the external object at a second time point at which an area and/or pressure of the external object are maximum, based on the identified signal. In an embodiment, the second processor may identify the first position of the external object at the first time point, based on a specified part (e.g., the part 1120 of FIG. 11 to FIG. 13) of the signal. In an embodiment, the second processor may identify the time point at which the area of the external object is maximum and/or the second position of the external object at the time point, based on the specified part (e.g., the parts 1110, 1210, and 1310 of FIG. 11 to FIG. 13) of the signal. In an embodiment, the second processor may identify, from one signal, the first position and second position of the external object respectively at the first time point and second time point, which overlap each other or which are different from each other.

Referring to FIG. 14, in operation 1430, the second processor of the electronic device according to certain embodiments may perform at least one function of an application being executed by the second processor, based on the first position and/or the second position. For example, when an on-screen keyboard is displayed in a display, based on the application being executed in the processor, the second processor may process a user's touch input received in the on-screen keyboard according to the first position and/or second position identified based on the operation 1420.

For example, at a time point (e.g., the time point 635 of FIG. 6 and/or the $10^{th}$ time point of Table 1) at which the user completes the touching of any one key in the on-screen keyboard, the second processor may identify a key in the on-screen keyboard touched by an external object, based not only on the first position of the external object measured at the first time point but also the second position of the external object at the second time point at which the area of the contact surface of the external object identified based on the operation 1420 is maximum. The second processor may perform a function related to the application, based on the identified key (e.g., a function of receiving a character string from the user, based on the identified key).

In an embodiment, which position will be used between the first position and the second position by the second processor to process a user's touch input may be determined based on a user's choice and/or the application being executed in the second processor. For example, when it is configured that the user processes the touch input on the basis of the second position at the time point at which the area of the contact surface is maximum, the electronic device may process the touch input on the basis of the second position. For example, when the area of the contact surface is relatively small such as a stylus or when a relatively precise touch control (e.g., when a part of the display is enlarged when displayed, such as a magnifying glass tool) is requested, the electronic device may process the touch input on the basis of the second position.

The electronic device according to certain embodiments may identify the area of the contact surface of the external object, which touches the display and/or the touch sensor, and/or a pressure of the external object. The electronic device may identify a time point at which the area and/or the pressure are maximum, within a time interval in which the external object and the display are in contact. The electronic device may perform at least one function, based on a position of the external object within the display at the identified time point. Since the electronic device further considers the position of the external object at the time point at which the area of the contact surface of the external object and/or the pressure of the external object is maximum, the electronic device may more accurately identify a position pointed by the user, based on the external object.

According to an embodiment, an electronic device comprises a housing, a display including at least one region corresponding to at least one surface of the housing, a touch sensor for detecting a touch input on the at least one region, a first processor operably coupled to the touch sensor, and a second processor operably coupled to the display, the touch sensor, and the first processor, wherein the first processor is configured to detect first position information of an external object touching the at least one region and first energy information related to a contact surface of the external object, based on a capacitance measured from the touch sensor at a first time point, detect second position information of the external object which touches the at least one region and second energy information related to the contact surface of the external object, based on a capacitance measured from the touch sensor at a second time point which comes after the first time point, and transmit a signal to the second processor, wherein the signal is based on at least one of the first position information, the second position information, the first energy information, and the second energy information.

According to certain embodiments, the first processor transmits to the second processor the signal which is based on at least one of the first position information, the second position information, the first energy information, and the second energy information at each of the first time point and second time point separated by a specified period.

According to certain embodiments, the first processor inserts a specified value indicating whether a change in the capacitance measured from the touch sensor at the first time point and the second time point is a maximum into signals transmitted respectively at the first time point and the second time point.

According to certain embodiments, the first processor combines the first energy information and the second energy information measured respectively at the first time point and the second time point to respective signals transmitted at the first time point and the second time point.

According to certain embodiments, the first processor combines position information of the external object, measured at a time point when a change in the capacitance is maximum, from the first position information and the second position information into the signal and transmits the signal to the second processor.

According to certain embodiments, the touch sensor transmits to the first processor a plurality of parameters corresponding respectively to a plurality of cells included in the at least one region and which are based on a capacitance measured in the respective plurality of cells, and the first processor obtains the first position information or second position information related to the external object, based on at least one of the plurality of parameters.

According to certain embodiments, the second processor identifies a coordinate of the external object which touches the at least one region at a time point between the first time point and the second time point at which a change in the capacitance is maximum, in response to identifying the signal transmitted from the first processor, and performs at least one function of an application being executed by the second processor, based on the identified coordinate of the external object.

According to certain embodiments, in response to identifying a plurality of time points at which a change in the capacitance is maximum from the signal, the second processor performs the at least one function, based on position information of the external object at a last time point among the plurality of time points.

According to an embodiment, an electronic device comprises a display, a touch sensor disposed to the display, and a processor operably coupled to the touch sensor, wherein the processor is configured to, detect first position information of an external object touching the display corresponding to the touch sensor and first energy information related to a contact surface of the external object, based on a capacitance measured from the touch sensor at a first time point, detect second position information of the external object touching the at least one region and second energy information related to the contact surface of the external object, based on a capacitance measured from the touch sensor at a second time point which comes after the first time point, and transmit a signal to a second processor, wherein the signal is based on at least one of the first position information, the second position information, the first energy information, and the second energy information.

According to certain embodiments, the processor inserts a specified value indicating whether position information of the external object identified every specified period is a) position measured at a time point at which a change in the capacitance is maximum for a time) period between the first time point and the second time point, into the signal.

According to certain embodiments, the processor inserts information combined with a plurality of parameters obtained from the touch sensor at a time point at which a change in the capacitance is maximum for a time period between the first time point and the second time point into the signal.

According to certain embodiments, the processor inserts a position of the external object which touches the display at a time point at which a change in the capacitance is maximum for a time period between the first time point and the second time point into the signal.

According to certain embodiments, the processor is configured to identify, from information of the touch sensor, a plurality of parameters respectively corresponding to a plurality of cells within the display and based on a capacitance measured in each of the plurality of cells and obtain the first energy information or the second energy information, based on the identified plurality of parameters.

According to certain embodiments, the processor outputs the signal periodically.

According to an embodiment, an electronic device comprises a housing, a display including at least one region corresponding to at least one surface of the housing, a touch sensor for detecting a touch input on the at least one region, a first processor operably coupled to the touch sensor, and a second processor operably coupled to the display, the touch sensor, and the first processor, wherein the second processor is configured to identify a signal related to an external object touching the display and based on a specified period from the first processor identify a first position of the display at a first time point when the signal was generated and a second position of the display at a second time point when at least one of an area and pressure of the external object is maximum during a specified period of time starting from the first time point, based on the identified signal, and perform at least one function of an application, based on at least one of the first position and second position identified from the signal.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the certain embodiments of the disclosure are not limited to a single or a plurality of components. Therefore, a component expressed in a plural form can also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

The invention claimed is:

1. An electronic device comprising:
    a housing;
    a display including at least one region corresponding to at least one surface of the housing;
    a touch sensor for detecting a touch input on the at least one region;
    a first processor operably coupled to the touch sensor; and
    a second processor operably coupled to the display, the touch sensor, and the first processor, wherein the first processor is configured to:
        detect first position information of an external object touching the at least one region and first energy information indicating a first area of a contact surface between the display and the external object, based on a capacitance measured from the touch sensor at a first time point;
        transmit a first signal to the second processor based on the first position information and the first energy information;
        detect second position information of the external object which touches the at least one region and second energy information indicating a second area of the contact surface between the display and the external object, based on a capacitance measured from the touch sensor at a second time point which comes after the first time point;
        generate a second signal based on the second position information and the second energy information, the second signal including information on an area of the contact surface measured at a third time point at which the area of the contact surface between the display and the external object is maximum after contact between the display and the external object is initiated; and
        transmit the second signal to the second processor.

2. The electronic device of claim 1, wherein a difference of the first time point and second time point is a multiple of a specified period.

3. The electronic device of claim 2, wherein the first processor inserts a specified value indicating whether a change in the capacitance measured from the touch sensor at the first time point and the second time point is a maximum into the first signal and the second signal respectively.

4. The electronic device of claim 2,
    wherein the touch sensor transmits to the first processor a plurality of parameters corresponding respectively to a plurality of cells included in the at least one region and which are based on a capacitance measured in the respective plurality of cells, and
    wherein the first processor obtains the first position information or second position information related to the external object, based on at least one of the plurality of parameters.

5. The electronic device of claim 1, wherein the second processor identifies a coordinate of the external object which touches the at least one region at a time point between the first time point and the second time point at which a change in the capacitance is maximum, in response to identifying the second signal transmitted from the first processor, and
    performs at least one function of an application being executed by the second processor, based on the identified coordinate of the external object.

6. The electronic device of claim 5, wherein, in response to identifying a plurality of time points at which a change in the capacitance is maximum from the second signal, the second processor performs the at least one function, based on position information of the external object at a last time point among the plurality of time points.

7. An electronic device comprising:
    a display;
    a touch sensor disposed to the display; and
    a processor operably coupled to the touch sensor, wherein the processor is configured to:
  detect first position information of an external object touching the display corresponding to the touch sensor and first energy information indicating a first area of a contact surface between the display and the external object, based on a capacitance measured from the touch sensor at a first time point;
  transmit a first signal to a second processor based on the first position information and the first energy information;
  detect second position information of the external object touching at least one region and second energy information indicating a second area of the contact surface between the display and the external object, based on a capacitance measured from the touch sensor at a second time point which comes after the first time point;
  generate a second signal based on the second position information and the second energy information, the second signal including information on an area of the contact surface measured at a third time point at which the area of the contact surface between the display and the external object is maximum after contact between the display and the external object is initiated; and
  transmit the second signal to the second processor.

8. The electronic device of claim 7, wherein the processor inserts a specified value indicating whether position information of the external object identified every specified period is a position measured at a time point at which a change in the capacitance is maximum for a time period between the first time point and the second time point, into the first signal and the second signal respectively.

9. The electronic device of claim 7, wherein the processor is configured to:
  identify, from information of the touch sensor, a plurality of parameters respectively corresponding to a plurality of cells within the display and based on a capacitance measured in each of the plurality of cells; and
  obtain the first energy information or the second energy information, based on the identified plurality of parameters.

10. An electronic device comprising:
a housing;
a display including at least one region corresponding to at least one surface of the housing;
a touch sensor for detecting a touch input on the at least one region;
a first processor operably coupled to the touch sensor; and
a second processor operably coupled to the display, the touch sensor, and the first processor, wherein the second processor is configured to:
  identify a first signal related to an external object touching the display from the first processor, wherein the first signal includes first position information of the external object and first energy information indicating a first area of a contact surface between the display and the external object, and wherein the first position information and first energy information are detected by the first processor based on a capacitance measured from the touch sensor at a first time point;
  identify a second signal related to the external object from the first processor, wherein the second signal includes second position information of the external object and second energy information indicating a second area of the contact surface, wherein the second position information and the second energy information are generated by the first processor based on a capacitance measured form the touch sensor at second time point, and wherein the second signal includes information on an area of the contact surface measured at a third time point at which the area of the contact surface between the display and the external object is maximum after contact between the display and the external object is initiated;
  determine a coordinate of the external object based on the information on the area of the contact surface measured at the third time point; and
  perform at least one function of an application based on the determined coordinate.

* * * * *